United States Patent
Starke et al.

(10) Patent No.: US 12,138,543 B1
(45) Date of Patent: Nov. 12, 2024

(54) ENHANCED ANIMATION GENERATION BASED ON GENERATIVE CONTROL

(71) Applicant: Electronic Arts Inc., Redwood City, CA (US)

(72) Inventors: Wolfram Sebastian Starke, Edinburgh (GB); Yiwei Zhao, Sunnyvale, CA (US); Mohsen Sardari, Redwood City, CA (US); Harold Henry Chaput, Castro Valley, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 285 days.

(21) Appl. No.: 17/248,336

(22) Filed: Jan. 20, 2021

Related U.S. Application Data

(60) Provisional application No. 62/963,970, filed on Jan. 21, 2020.

(51) Int. Cl.
*A63F 13/57* (2014.01)
*G06N 3/04* (2023.01)
(Continued)

(52) U.S. Cl.
CPC .............. *A63F 13/57* (2014.09); *G06N 3/04* (2013.01); *G06N 3/08* (2013.01); *G06T 13/40* (2013.01); *G06T 13/80* (2013.01); *G06T 2200/24* (2013.01)

(58) Field of Classification Search
CPC .. A63F 13/57; G06N 3/04; G06N 3/08; G06T 13/40; G06T 13/80; G06T 2200/24
See application file for complete search history.

(56) References Cited

U.S. PATENT DOCUMENTS 5,274,801 A   12/1993   Gordon
5,548,798 A    8/1996   King
(Continued)

FOREIGN PATENT DOCUMENTS

CN   102509272 A   6/2012
CN   103546736 A   1/2014
(Continued)

OTHER PUBLICATIONS

Anagnostopoulos et al., "Intelligent modification for the daltonization process", International Conference on Computer Vision Published in 2007 by Applied Computer Science Group of digitized paintings.
(Continued)

*Primary Examiner* — Malina D. Blaise
(74) *Attorney, Agent, or Firm* — Knobbe, Martens, Olson & Bear, LLP

(57) ABSTRACT

Systems and methods are provided for enhanced animation generation based on generative control models. An example method includes accessing an autoencoder trained based on character control information generated using motion capture data, the character control information indicating, at least, trajectory information associated with the motion capture data, and the autoencoder being trained to reconstruct, via a latent feature space, the character control information. First character control information associated with a trajectory of an in-game character of an electronic game is obtained. A latent feature representation is generated and the latent feature representation is modified. A control signal is output to a motion prediction network for use in updating a character pose of the in-game character.

17 Claims, 15 Drawing Sheets

(51) Int. Cl.
  *G06N 3/08* (2023.01)
  *G06T 13/40* (2011.01)
  *G06T 13/80* (2011.01)

(56) References Cited

U.S. PATENT DOCUMENTS

| | | | |
|---|---|---|---|
| 5,982,389 A | 11/1999 | Guenter et al. | |
| 5,999,195 A | 12/1999 | Santangeli | |
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B2 | 11/2005 | Mochizuki et al. | |
| 7,006,090 B2 | 2/2006 | Mittring | |
| 7,403,202 B1 | 7/2008 | Nash | |
| 7,415,152 B2 | 8/2008 | Jiang et al. | |
| 7,944,449 B2 | 5/2011 | Petrovic et al. | |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,406,528 B1 | 3/2013 | Hatwich | |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,648,863 B1 | 2/2014 | Anderson et al. | |
| 8,860,732 B2 | 10/2014 | Popovic et al. | |
| 8,914,251 B2 | 12/2014 | Ohta | |
| 9,001,132 B1 | 4/2015 | Wooley | |
| 9,117,134 B1 | 8/2015 | Geiss et al. | |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,652,879 B2 * | 5/2017 | Aguado | G06T 13/40 |
| 9,741,146 B1 * | 8/2017 | Nishimura | G06T 13/40 |
| 9,811,716 B2 | 11/2017 | Kim et al. | |
| 9,826,898 B1 | 11/2017 | Jin et al. | |
| 9,858,700 B2 | 1/2018 | Rose et al. | |
| 9,861,898 B2 * | 1/2018 | Miura | H04N 21/4781 |
| 9,947,123 B1 | 4/2018 | Green | |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,314,477 B1 | 6/2019 | Goodsitt et al. | |
| 10,388,053 B1 | 8/2019 | Carter, Jr. et al. | |
| 10,403,018 B1 | 9/2019 | Worsham | |
| 10,440,443 B2 | 10/2019 | Casey et al. | |
| 10,535,174 B1 | 1/2020 | Rigiroli et al. | |
| 10,726,611 B1 | 7/2020 | Court | |
| 10,733,765 B2 | 8/2020 | Andreev | |
| 10,755,466 B2 | 8/2020 | Chamdani et al. | |
| 10,792,566 B1 | 10/2020 | Schmid | |
| 10,825,220 B1 * | 11/2020 | Chang | G06T 13/00 |
| 10,856,733 B2 | 12/2020 | Anderson et al. | |
| 10,860,838 B1 | 12/2020 | Elahie et al. | |
| 10,878,540 B1 | 12/2020 | Stevens | |
| 10,902,618 B2 | 1/2021 | Payne et al. | |
| 10,986,400 B2 * | 4/2021 | Hua | H04N 21/44008 |
| 11,017,560 B1 * | 5/2021 | Gafni | G06N 3/08 |
| 11,403,513 B2 * | 8/2022 | Hasenclever | G06N 3/084 |
| 11,562,523 B1 | 1/2023 | Starke et al. | |
| 11,670,030 B2 | 6/2023 | Shi et al. | |
| 11,830,121 B1 * | 11/2023 | Starke | G06N 3/02 |
| 2002/0054054 A1 | 5/2002 | Sanbe | |
| 2002/0089504 A1 | 7/2002 | Merrick et al. | |
| 2002/0180739 A1 | 12/2002 | Reynolds et al. | |
| 2003/0038818 A1 | 2/2003 | Tidwell | |
| 2004/0027352 A1 | 2/2004 | Minakuchi | |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |
| 2006/0217945 A1 | 9/2006 | Leprevost | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0111831 A1 | 5/2008 | Son et al. | |
| 2008/0152218 A1 | 6/2008 | Okada | |
| 2008/0268961 A1 | 10/2008 | Brook | |
| 2008/0273039 A1 * | 11/2008 | Girard | G06T 17/00 345/475 |
| 2008/0316202 A1 | 12/2008 | Zhou et al. | |
| 2009/0066700 A1 | 3/2009 | Harding et al. | |
| 2009/0195544 A1 * | 8/2009 | Wrinch | G06T 13/40 345/473 |
| 2009/0315839 A1 | 12/2009 | Wilson et al. | |
| 2010/0134501 A1 * | 6/2010 | Lowe | G06T 13/40 345/473 |
| 2010/0251185 A1 | 9/2010 | Pattenden | |
| 2010/0277497 A1 | 11/2010 | Dong et al. | |
| 2011/0012903 A1 | 1/2011 | Girard | |
| 2011/0074807 A1 | 3/2011 | Inada et al. | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0187731 A1 | 8/2011 | Tsuchida | |
| 2011/0269540 A1 | 11/2011 | Gillo et al. | |
| 2011/0292055 A1 | 12/2011 | Hodgins et al. | |
| 2012/0029699 A1 | 2/2012 | Jing | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0275521 A1 | 11/2012 | Cui et al. | |
| 2012/0303343 A1 | 11/2012 | Sugiyama et al. | |
| 2012/0313931 A1 | 12/2012 | Matsuike et al. | |
| 2013/0050464 A1 | 2/2013 | Kang | |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2013/0311885 A1 | 11/2013 | Wang et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2014/0285513 A1 * | 9/2014 | Aguado | G06T 13/40 345/620 |
| 2014/0327694 A1 | 11/2014 | Cao et al. | |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0042548 A1 | 2/2016 | Du et al. | |
| 2016/0071470 A1 | 3/2016 | Kim et al. | |
| 2016/0217723 A1 | 7/2016 | Kim et al. | |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0132827 A1 | 5/2017 | Tena et al. | |
| 2017/0221250 A1 | 8/2017 | Aguado | |
| 2017/0301310 A1 | 10/2017 | Bonnier et al. | |
| 2017/0301316 A1 | 10/2017 | Farell | |
| 2018/0122125 A1 | 5/2018 | Brewster | |
| 2018/0165864 A1 * | 6/2018 | Jin | G06F 3/0346 |
| 2018/0211102 A1 | 7/2018 | Alsmadi | |
| 2018/0239526 A1 | 8/2018 | Varanasi et al. | |
| 2018/0293736 A1 * | 10/2018 | Rahimi | G06V 10/454 |
| 2019/0073826 A1 | 3/2019 | Bailey et al. | |

(56) References Cited

U.S. PATENT DOCUMENTS

| | | | |
|---|---|---|---|
| 2019/0147224 | A1 | 5/2019 | Li et al. |
| 2019/0228316 | A1* | 7/2019 | Felsen ............... G06N 20/00 |
| 2019/0295305 | A1 | 9/2019 | Yang et al. |
| 2019/0303658 | A1 | 10/2019 | Ando et al. |
| 2019/0340803 | A1 | 11/2019 | Comer |
| 2019/0392587 | A1 | 12/2019 | Nowozin et al. |
| 2020/0058148 | A1* | 2/2020 | Blaylock ............. G06T 7/251 |
| 2020/0294299 | A1 | 9/2020 | Rigiroli et al. |
| 2020/0353311 | A1* | 11/2020 | Ganguly .............. G06N 3/08 |
| 2020/0388065 | A1 | 12/2020 | Miller, IV et al. |
| 2020/0402284 | A1 | 12/2020 | Saragih et al. |
| 2021/0019916 | A1 | 1/2021 | Andreev |
| 2021/0166459 | A1* | 6/2021 | Miller, IV .......... G06F 1/1637 |
| 2021/0217184 | A1 | 7/2021 | Payne et al. |
| 2021/0220739 | A1* | 7/2021 | Zinno ................. G06N 3/08 |
| 2021/0292824 | A1 | 9/2021 | Zhang et al. |
| 2021/0312689 | A1* | 10/2021 | Akhoundi ........... G06N 20/00 |
| 2021/0335004 | A1 | 10/2021 | Zohar et al. |
| 2021/0375021 | A1* | 12/2021 | Starke ................ G06N 3/047 |
| 2021/0383585 | A1* | 12/2021 | Zhao ................. G06F 18/214 |
| 2021/0406765 | A1* | 12/2021 | Zhang ................ G06N 3/047 |
| 2022/0035443 | A1 | 2/2022 | Winold et al. |
| 2022/0076472 | A1 | 3/2022 | Bocquelet et al. |
| 2022/0101646 | A1 | 3/2022 | McDonald et al. |
| 2022/0215232 | A1* | 7/2022 | Pardeshi ............. G06N 3/006 |
| 2022/0230376 | A1* | 7/2022 | Rozantsev .......... H04N 19/537 |
| 2022/0254157 | A1 | 8/2022 | Fu et al. |
| 2022/0292751 | A1 | 9/2022 | Kimura |
| 2022/0319087 | A1 | 10/2022 | Zhang |
| 2022/0379167 | A1 | 12/2022 | Lee |
| 2023/0010480 | A1 | 1/2023 | Li et al. |
| 2023/0123820 | A1* | 4/2023 | Wang .................. G06N 3/045 |
| | | | 345/474 |
| 2023/0177755 | A1 | 6/2023 | Starke et al. |
| 2023/0186541 | A1* | 6/2023 | Starke ................ G06T 13/40 |
| 2023/0186543 | A1 | 6/2023 | Starke et al. |
| 2023/0237724 | A1 | 7/2023 | Starke et al. |
| 2023/0267668 | A1 | 8/2023 | Starke et al. |
| 2023/0300667 | A1 | 9/2023 | Baek |
| 2023/0310998 | A1 | 10/2023 | Starke et al. |
| 2023/0326113 | A1* | 10/2023 | Hellge ................ G06T 13/20 |
| | | | 345/473 |
| 2023/0334744 | A1 | 10/2023 | Liu |
| 2023/0394735 | A1 | 12/2023 | Shi et al. |

FOREIGN PATENT DOCUMENTS

| | | |
|---|---|---|
| CN | 105405380 A | 3/2016 |
| CN | 105825778 A | 8/2016 |
| CN | 110039546 A | 7/2019 |
| JP | 2018-520820 A | 8/2018 |
| JP | 2019-162400 A | 9/2019 |
| WO | WO 2019/184633 A1 | 10/2019 |
| WO | WO 2020/204948 A1 | 10/2020 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/ Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Halder et al., "Image Color Transformation for Deuteranopia Patients using Daltonization", IOSR Journal of VLSI and Signal Processing (IOSR-JVSP) vol. 5, Issue 5, Ver. I (Sep-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computación y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in |Computer Games", Eurographics/ACM SIGGRAPH Symposium on Computer Animation (2012), 6 pgs.

Klein, Joseph. Rendering Textures Up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

McAdams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). Vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

(56) References Cited

OTHER PUBLICATIONS

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse, Soraia Raupp, and Daniel Thalmann. "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, Sergio, et al. "Reducing memory requirements for diverse animated crowds." Proceedings of Motion on Games. ACM, 2013.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", Dec. 2011, in 10 pgs.

Sifakis, Eftychios D., "Fem Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGGRAPH Symposium on Computer Animation (2012), 9 pgs.

Thalmann, Daniel, and Soraia Raupp Musse. "Crowd rendering." Crowd Simulation. Springer London, 2013. 195-227.

Thalmann, Daniel, and Soraia Raupp Musse. "Modeling of Populations." Crowd Simulation. Springer London, 2013. 31-80.

Treuille, A et al., "Near-optimal Character Animation with Continuous Control", University of Washington, 2007, 7 pgs.

Ulicny, Branislav, and Daniel Thalmann. "Crowd simulation for interactive virtual environments and VR training systems." Computer Animation and Simulation 2001 (2001 ): 163-170.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Vigueras, Guillermo, et al. "A distributed visualization system for crowd simulations." Integrated Computer-Aided Engineering 18.4 (2011 ): 349-363.

Wu et al., "Goal-Directed Stepping with Momentum Control," Eurographics/ ACM SIGGRAPH Symposium on Computer Animation, 2010, 6 pages.

Habibie et al., "A Recurrent Variational Autoencoder for Human Motion Synthesis", 2017, in 12 pages.

Geijtenbeek et al. (Interactive Character Animation Using Simulated Physics: A State-of-the-Art Review), Computer Graphics forum, vol. 31, 2012 (Year: 2012), 24 pgs.

Clavet, "Motion matching and the road to next-gen animation," In Proc. of GDC. 2016 (Year: 2016).

Holden et al., "Phase-functioned neural networks for character control," ACM Transactions on Graphics (TOG). Jul. 20, 2017;36(4): 1-3. (Year: 2017).

Starke et al., "Local motion phases for learning multi-contact character movements." ACM Transactions on Graphics (TOG). Jul. 8, 2020;39(4):54-1 (Year: 2020).

Zhang et al., "Mode-adaptive neural networks for quadruped motion control. ACM Transactions on Graphics (TOG)." Jul. 30, 2018;37(4): 1-1. (Year: 2018).

Liu Shikai, "Method, Device, Equipment and Storage for generating walking animation of Virtual Character", English Translation of CN 202111374361.9, Nov. 19, 2021 (Year: 2021).

Min et al., "Interative Generation of Human Animation with Deformable Motion Models" (Year: 2009).

Yamane et al.," Natural Motion Animation through Constraining and Deconstraining at Will" (Year: 2003).

\* cited by examiner

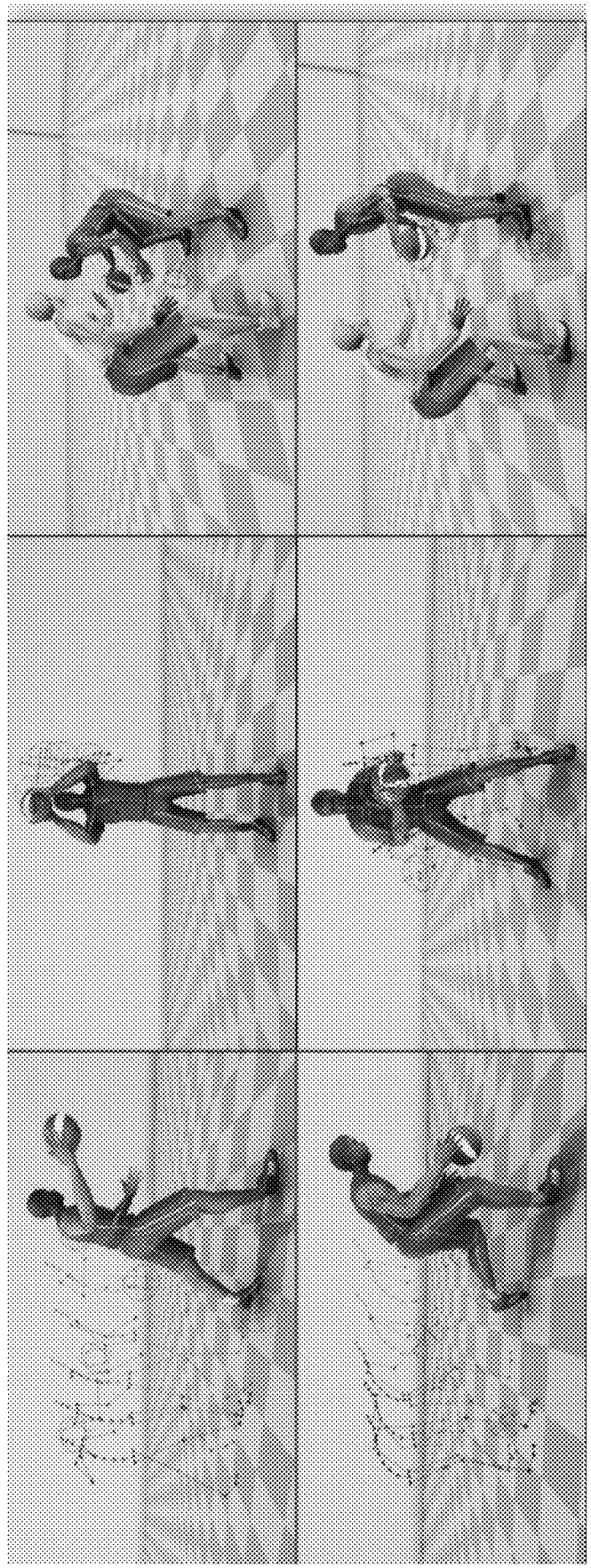

ENHANCED ANIMATION GENERATION BASED ON GENERATIVE CONTROL

CROSS-REFERENCE TO RELATED APPLICATIONS

This application claims priority to U.S. Prov. App. No. 62/963,970 titled "SYSTEMS AND METHODS FOR LEARNING DYNAMIC MOVEMENTS" and filed on Jan. 21, 2020, the disclosure of which is hereby incorporated herein by reference in its entirety.

TECHNICAL FIELD

The present disclosure relates to systems and techniques for animation generation. More specifically, this disclosure relates to machine learning techniques for dynamically generating animation.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game developers. As an example, electronic game developers may be required to create very rich, and detailed, models of characters. As another example, electronic game designers may be required to create fluid, lifelike, movements of the characters With respect to the example of movement, characters may be designed to realistically adjust their arms, legs, and so on, while traversing an in-game world. In this way, the characters may walk, run, jump, and so on, in a lifelike manner. With respect to a sports electronic game, substantial time may be spent ensuring that the characters appear to mimic real-world sports players. For example, electronic game designers may spend substantial time fine-tuning movements of an underlying character model. Movement of a character model may be, at least in part, implemented based on movement of an underlying skeleton. For example, a skeleton may include a multitude of objects (e.g., bones or joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running via adjustment of specific objects which form a character model's legs. This hand-tuned technique to enable movement of a character results in substantial complexity and usage of time.

SUMMARY OF CERTAIN EMBODIMENTS

Particular embodiments of the subject matter described in this specification can be implemented so as to realize one or more of the following advantages. Utilizing the techniques described herein, realistic motion may be rapidly generated for arbitrary character models configured for use in electronic games. As will be described, a machine learning model may be trained based on motion capture information. Subsequently, the machine learning model may directly generate information usable to create rich, life-like, animations for character models. Advantageously, these animations may be responsive to real-time user input being provided by a user of an electronic game. For example, a generative control model may be trained to output complex control signals based on high-level user input. In this example, machine learning model may be trained to output animations based on the control signals such that subtle variations of the user input are effectuated. As an example, user input to cause the character model to move forward may result in varied, and complex, forward movement animations.

At present, techniques to generate realistic motion for character models may rely upon designers adjusting character models to define different types of motion. For example, to define running, a designer may string together certain adjustments of joints on a skeleton of a character model. In this example, the designer may adjust the knees, cause a movement of the arms, and so on. While this may allow for motion to be generated, it may also involve a substantial burden on the designer.

A first example technique to, at least in part, automate generation of character motion, may include using software to automatically adjust a skeleton. For example, templates of running may be pre-defined. In this example, a designer may select a running template which may cause adjustment of the joints on a skeleton. Thus, the designer may more rapidly generate motion for characters in an in-game world. However, this first example technique may lack the realism of real-world movement. For example, since different templates are being selected, the lifelike differences in movement between real-world persons is lost.

In contrast, the techniques described herein allow for the rapid generation of character animation based on automated analyses of motion capture information. For example, an actor may be placed in a motion capture studio. The actor may then perform different movements, and movement of different portions of the actor (e.g., joints) may be stored by a system. By training a machine learning model to generate animation based on motion capture information, the model may allow for enhanced nuance associated with the animation. As an example, a real-life wrestler may be used as an actor. In this example, video of the wrestler may be recorded which depicts the wrestler moving about a ring, interacting with an opponent, performing different moves, and so on. The machine learning model may then be trained based on this video, such that the model can reproduce the highly stylized, and personal, movement of the wrestler.

The techniques described herein therefore improve upon the functioning of prior software-based techniques to generate movement of in-game character models. As described above, prior techniques relied upon designers to adjust positions of joints on a skeleton underlying a character model. For example, different key frames or clips of animation may be produced. In this example, an electronic game may interpolate between key frames or play these clips of animation. In contrast, the techniques described herein allow for real-time generation of motion of the character model. The motion may adhere to motion learned from one or more motion capture actors. Advantageously, the machine learning model may provide for a wide variety of motions and poses based on similar user input. Thus, the model may provide variations to character poses which enhance a realism associated with animation generation and electronic games. For example, a user of an electronic game may provide similar user input but be able to view varied, lifelike, animations for an in-game character.

The systems, methods, and devices of this disclosure each have several innovative aspects, no single one of which is solely responsible for all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 4C illustrates example character pose variations.

Like reference numbers and designations in the various drawings indicate like elements.

DETAILED DESCRIPTION

Overview

Figure 1A:
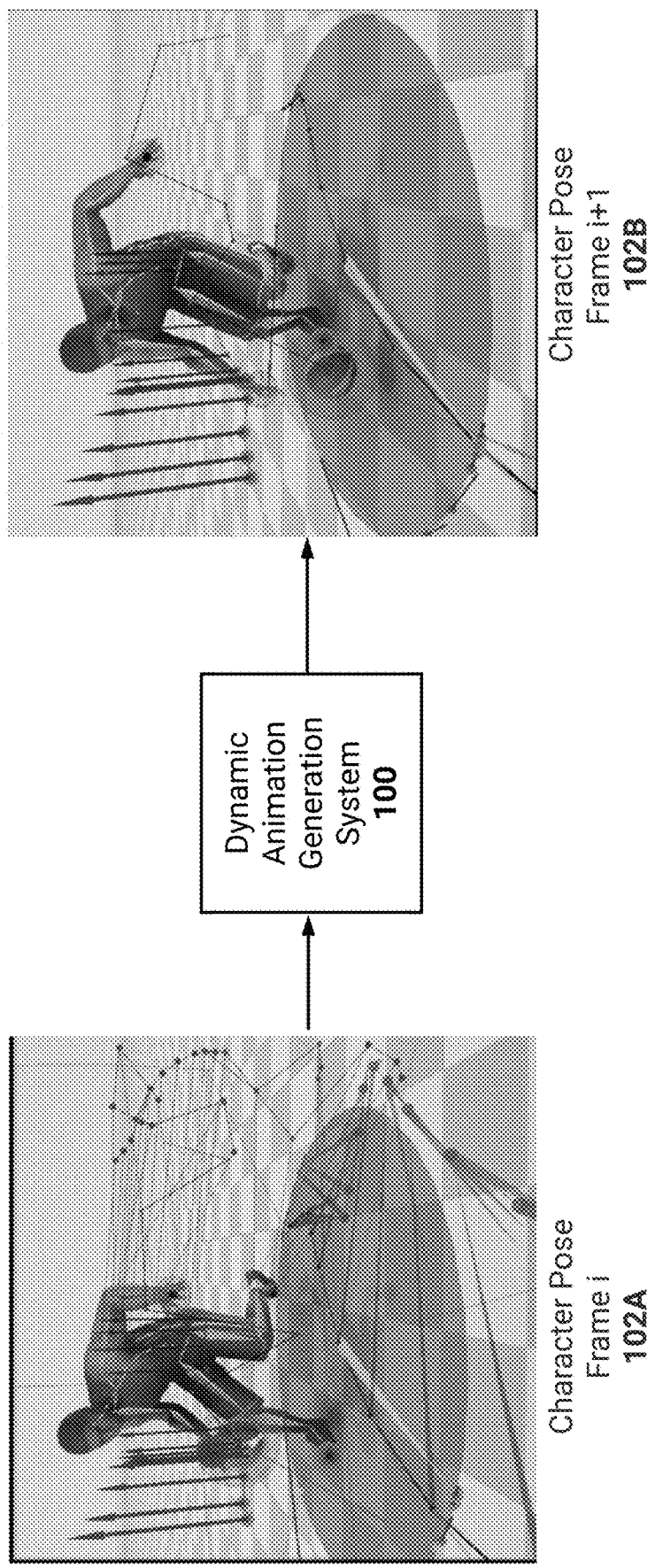
FIG. 1A is a block diagram of an example dynamic animation generation system generating a character pose for a frame of an electronic game.

This specification describes, among other things, technical improvements with respect to generation of motion for characters configured for use in electronic games. As will be described, a system described herein (e.g., the dynamic animation generation system 100) may implement a motion generation machine learning model (e.g., motion generation network) to generate realistic motion based on analyses of motion capture information. Advantageously, the system may perform substantially automated analyses of the motion capture information such that complex machine learning labeling processes may be avoided. While electronic games are described, it may be appreciated that the techniques described herein may be applied generally to movement of character models. For example, animated content (e.g., TV shows, movies) may employ the techniques described herein.

As will be described, the system may generate realistic motion using one or more deep-learning models. An example deep-learning model described herein includes a generative control model usable to inform generation of highly variable, and realistic, animations for characters. As will be described, the generative control model may be trained based on motion capture information of real-world actors. The model may learn to output a control signal which informs movement of an in-game character. During runtime of an electronic game, the model may leverage motion information of the in-game character along with user input, for example as an aggregate input. Thus, the output may be adjusted according to the user input. The generative control model may map the input to a learned latent feature space, and via sampling the space, output a varied control signal for use by a motion generation model or network (e.g., the motion prediction engine 130). As will be described, realistic animations may be generated by the system based on these models.

Background—Motion Generation

Motion may be defined, at least in part, based on distinct poses of an in-game character. As an example, each pose may represent a discrete sample of the motion to be performed by the in-game character. For this example, the pose may identify positions of bones or joints of the in-game character. Thus, if motion is to depict running, each pose may represent a snapshot of the running. For example, a first frame generated by an electronic game may include the in-game character with both feet on a surface within the game world. As another example, a second frame may include the in-game character beginning to move one of the feet upwards. It may be appreciated that subsequent frames may include the in-game character moving forward in a running motion.

Typically, the above-described in-game character may be animated to produce this running motion. For example, an electronic game designer may generate different key frames which depict poses used for the running motion. In this example, the electronic game designer may create key frames which depict the in-game character with its feet on a surface, with one leg partially raised upwards, and so on. During gameplay, the electronic game may interpolate between these key-frames such that the in-game character appears to transition between them. As another example, clips of animation may be generated by the electronic game designer for specific motions. In this example, one or more clips of animation may be generated to represent the running motion. These clips may then be played by the electronic game to produce animation. As may be appreciated, substantial variations of running may be created to produce more realistic, and distinct, motion for the in-game character.

To generate motions for in-game characters, electronic game designers are increasingly leveraging motion capture studios. For example, a motion capture studio may be used to learn the realistic gait of an actor as he/she moves about the motion capture studio. Specific portions of the actor, such as joints or bones, may be monitored during this movement. Subsequently, movement of these portions may be extracted from image or video data of the actor. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the actor.

While motion capture studios allow for realistic motion, they are limited in the types of motion able to be reproduced. For example, the above-described skeleton may be animated to reproduce motions which were specifically performed by the actor. Other motions may thus need to be manually created by an electronic game designer. For example, and with respect to a sports electronic game, a real-life basketball player may be used as an actor to perform common basketball motions. While this actor may perform a wide breadth of motions typically performed during a basketball game, as may be appreciated there are other motions which will not be recorded. For example, these other motions may be produced naturally by the actor during a real-world basketball game depending on locations of opponents, the actor's current stamina level, a location of the actor with respect to the basketball court, and so on.

Background—Machine Learning for Motion Generation

Machine learning models may be used to enhance generation of motion based on motion capture information. For example, a machine learning model may analyze motion capture information. In this example, the machine learning model may then be used to generate animation for an in-game character which is based on the motion capture information. Since these machine learning models may directly output poses for use in animating an in-game character, they may substantially reduce development time of the electronic game. Additionally, since they are trained using motion capture information the output poses may appear lifelike.

However, prior machine learning models have been unable to generate realistic motion. With respect to certain electronic games, such as sports games, they have been unable to generate the complex asynchronous movements performed by real-world sports players. For example, a first example machine learning model may be based on temporal alignment of motions. In this example, motions of a same type or class along a timeline may be blended with weights determined by the model. However, for electronic games which require quick movements (e.g., sports games, fighting games, action games), it may be impractical to classify and align a large database of motions.

A second example machine learning model may be based on a long short-term memory (LSTM) neural network model. As may be appreciated, the LSTM model may be used to predict a pose based on a prior pose of an in-game character. In this way, the pose of the in-game character may be updated based on user input and the prior pose. However, substantial difficulties exist with use of these models. For example, simpler LSTM models may be unable to produce realistic motions while more complex models may not generalize well. Additionally, the LSTM model may struggle to reach a memory state observed during training for a character to follow which is similar to received user input. That is, such LSTM models do not provide sufficient responsiveness to user input required for electronic games.

Generative Control Model

The motion generation network described herein may allow for realistic generation of motion. For example, poses which identify specific orientations of portions of a skeleton or rig may be generated by the model. In this example, an in-game character who is skinned over the skeleton or rig may thus be rendered to conform to these poses While generating realistic motion is important in an electronic game, an end-user may have limited control over the specific motions being created. For example, the end-user's input to an electronic game includes interaction with a controller. It may be appreciated that controllers have limited physical inputs with which the end-user may interact. As an example, the controller may have one or more control sticks which allow for fine-grain movement. A control stick may therefore be used to indicate movement of an in-game character in a lateral direction (e.g., forward, backward). With respect to a sports game, a control stick may be used to indicate momentum or force to be applied to a ball held by the in-game character. The controller may also include buttons which may be assigned to represent different in-game functionality. For example, a first button may be used to indicate that an in-game character is to jump. As another example, a second button may be used to indicate that the in-game character is to spin left or right. As another example, a third button may be used to indicate that the in-game character is to block another in-game character.

Therefore, the input providable by the end-user may represent high-level user inputs which lack fine-grained information. For example, there may be a plethora of types of motion for forward movement which a real-world person may perform. In this example, the real-world person's motion may naturally vary during the forward movement. In contrast, electronic games may utilize the same motion animation when the end-user moves the control stick forward. Similarly, a real-world basketball player may adjust his/her motion depending on a proximity of an opponent to the player when moving laterally. With respect to a sports electronic game, the end-user may merely be limited to adjustment of the control stick to indicate the lateral movement. Thus, the user's limited input capabilities may result in similar motion for an in-game character which reduces a realism of an electronic game.

Typically, electronic game designers may spend substantial amounts of time creating rules, heuristics, and so on, to allow for synthesizing of character motion based on high-level user inputs. Thus, when an in-game character is proximate to an opponent, a rule may indicate that a variation of forward motion is to be used. The variation may cause the in-game character to bounce the ball more closely to its body as compared to the character moving down an open court.

While these rules and heuristics may allow for variations, they face issues similar to other hand-created rules and heuristics. For example, they may provide limited variations in the generated motion. In this example, an electronic game may output similar in-game character motion when given a similar game state. As an example, the in-game character may be animated to move in a similar style when an opponent is similarly close. As another example, the variations producible by the electronic game may be based on a number and complexity of the hand-created rules and heuristics. Thus, the technical burden on electronic game designers may be great.

In contrast, the techniques described herein may enable different and detailed control variations based on sparse user input. As will be described, with respect to at least FIGS. 2A-2D, a generative control model may be used to generate a control signal based, in part, on received user input. In some embodiments, the generative control model may represent an autoencoder which encodes received user input into a learned latent feature space. This encoding may then be modified via the addition, or combination, of noise. Thus, the encoding may be perturbed in the latent feature space. The updated modified encoding may then be provided to the decoder to generate a more complex control signal. In this way, a same user input may be modified differently based on use of the learned latent feature space.

Advantageously, the generative control model may be trained based on motion capture information. For example, specific information may be extracted from the motion capture information (referred to herein as 'character control variables'). In this example, the information may include information describing character trajectory (e.g., locomotion), specific actions depicted in the motion capture information, and so on. The generative control model may be trained to reconstruct this specific information. In this way, latent feature space may represent a learned encoding of the information.

During runtime, for example during gameplay, user input may be received from an input controller. The user input may then be combined with the above-described specific information which is extracted from gameplay. An encoding of this combination may then be generated with respect to the latent feature space. Via perturbing the encoding, the decoder may generate subtle variations of control signals which are based on the user input. In this way, the user input may be used to guide the character locomotion, actions, and so on. Additionally, the resulting control signals may vary such that resulting character poses used to represent motion may vary.

These, and other features, will now be described in more detail.

Example Block Diagrams—Dynamic Animation Generation System

FIG. 1A is a block diagram of an example dynamic animation generation system 100 generating a subsequent character pose 102B based on a current character pose 102A. The illustrated dynamic animation generation system 100 may represent a system of one or more computers, one or more virtual machines executing on a system of one or more computers, and so on. In some embodiments, the dynamic animation generation system 100 may represent an application, or other software, which is executed by an electronic game system. Thus, the functionality described herein may be implemented by an electronic game system during gameplay of an electronic game. As will be described, the dynamic animation generation system 100 may implement a motion generation model to autoregressively output character poses to generate motion.

In the illustrated example, the character pose 102A depicts an in-game character dribbling a basketball. This character pose 102A may therefore represent a specific pose used in the dribbling motion. Additionally, this character pose 102A may be rendered for output in a particular frame of animation (e.g., frame i). As may be appreciated, fluid animation may be generated at a threshold frame rate (e.g., 30 frames per second, 60 frames per second). Thus, the particular frame of animation may represent one of these frames.

As will be described in more detail, the dynamic animation generation system 100 may use one or more machine learning models (collectively referred to as a 'motion generation model' or 'motion generation network') to generate the subsequent character pose 102B based on the character pose 102A. This subsequent character pose 102B may then be rendered for output in a subsequent frame of animation (e.g., frame i+1). For example, the dynamic animation generation system 100 may determine positions, orientations, and so on, of a skeleton or rig which underlies the illustrated in-game character (e.g., the bones, end effectors, and so on). In this example, the in-game character may be rendered to conform to these determined positions, orientations, such that the subsequent pose 102B may be output.

The dynamic animation generation system 100 may autoregressively generate character poses. For example, FIG. 1A illustrates the subsequent character pose 102B being generated based on character pose 102A. Thereafter, the subsequent character pose 102B may be used, at least in part, to generate another character pose. As will be described, this generation may be informed based on user input provided by an end-user using an input controller. Thus, the end-user may guide the resulting animation via interactions with the input controller.

Since the dynamic animation generation system 100 may directly generate character poses, the system 100 may allow for substantial storage savings with respect to character animations. For example, prior techniques to generate character animations have relied upon utilization of key-frames or animation clips. In this example, an electronic game may select a multitude of key-frames and interpolate them to generate animation for output to an end-user. These key-frames and animation clips may therefore have to be stored as information for use by the electronic game. This may increase a size associated with the electronic game, such as a download size, an installation size, and so on.

In contrast, the techniques described herein may allow for generation of animation based on use of one or more machine learning models. As may be appreciated, these machine learning models may be represented as weights, biases, and so on, which may be of a substantially smaller size. In this way, an electronic game may have a reduced size, reduced download time, reduced installation time, and so on, as compared to other electronic games.

Figure 1B:
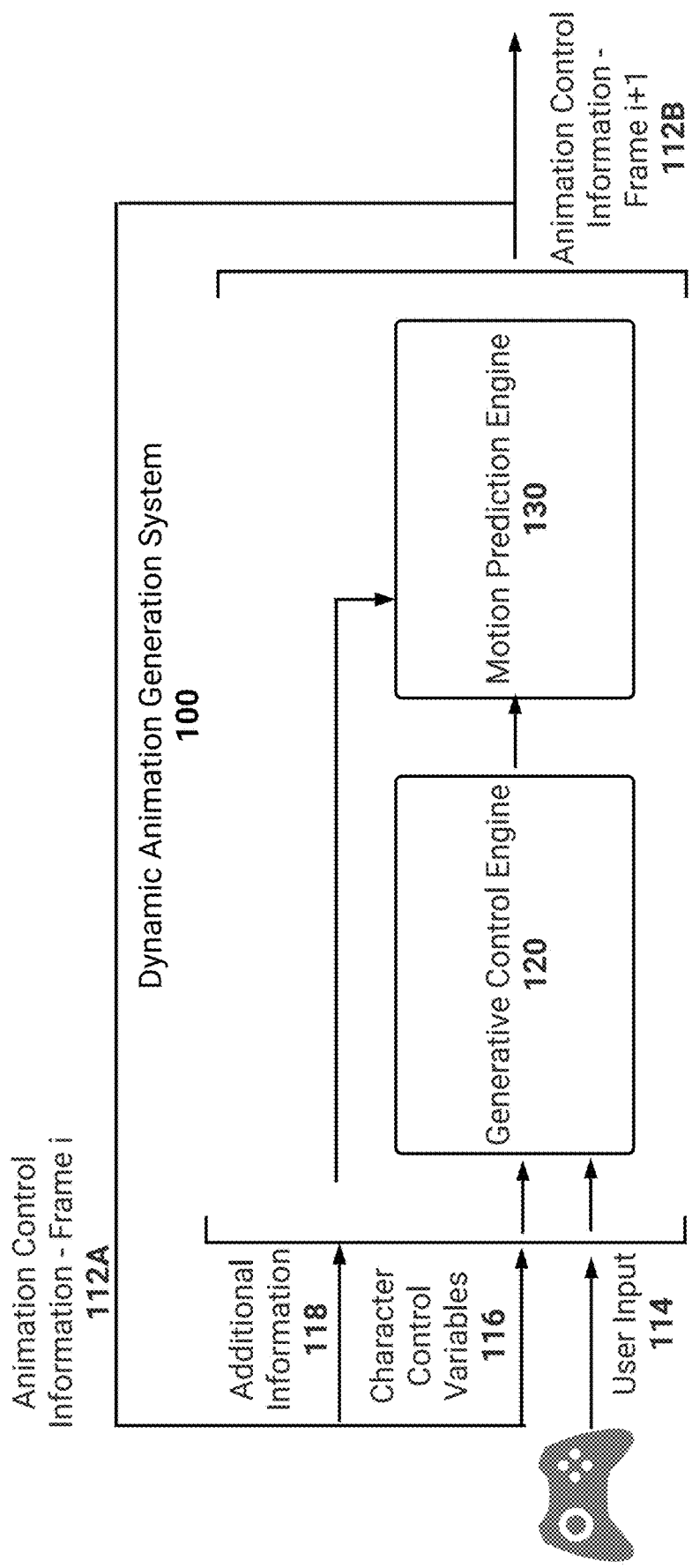
FIG. 1B is a detail block diagram of the dynamic animation generation system.

FIG. 1B is a block diagram illustrating detail of the dynamic animation generation system 100. In this illustrated example, the dynamic animation generation system 100 includes example engines 120 and 130, which collectively implement a motion generation model usable to dynamically generate animation.

The dynamic animation generation system 100 may generate particular information, referred to herein as 'animation control information', which may be autoregressively used to generate motion for an in-game character. For example, the animation control information may indicate a character pose (e.g., character poses 102A-102B illustrated in FIG. 1A). As illustrated, animation control information 112A generated for a first frame (e.g., frame 'i') may be used as an input for a second frame (e.g., frame 'i+1'). Animation control information 112B for the second frame may be generated by the system 100, and an underlying skeleton or rig of an in-game character may be updated according to an indicated character pose for the second frame.

Animation control information 112A may include character control variables 116. These variables 116 may inform the in-game character's motion. For example, the character control variables 116 may include trajectory information for the in-game character. In this example, the trajectory information may indicate positions of the in-game character (e.g., a current position and optionally one or more prior positions), velocity of the in-game character (current velocity and optionally one or more prior velocities), and so on. Therefore, the character control variables 116 may be used to predict subsequent motion of the in-game character. For example, if the in-game character is running forward in frame 'i' then it may be determined that the in-game character will remain running forward in frame 'i+1'. The variables 116 may additionally reflect positions, orientations, and so on, of bones, end effectors, and so on, of a skeleton or rig (e.g., character pose).

While the character control variables 116 may be used to predict motion, as may be appreciated the end user may adjust the in-game character's motion via user input 114. For example, the end user may utilize an electronic game controller to provide user input in the form of interactions with buttons, control sticks, and so on. In the above-described example in which the in-game character is running, the end user may provide user input 114 to maintain the running. For example, the user input 114 may indicate that a certain control stick is being pushed forward. However, the user input 114 may also indicate that the in-game character is to cease running or perform another movement (e.g., jump, shift directions, stop and shoot a basketball, and so on).

The character control variables 116 and user input 114 may therefore be combined by the dynamic animation generation system 100. In this way, the user input 114 may provide adjustments to motion predicted in frame 'i'. In some embodiments, the character control variables 116 and user input 114 may be separately weighted prior to combining. Therefore, a greater or lesser weight may be applied to the user input 114.

The dynamic animation generation system 100 includes a generative control engine 120 which receives the combination of the character control variables 116 and user input 114. The generative control engine 120 may then output a control signal for use by the dynamic animation generation system 100 in generating animation control information 112B for frame 'i+1'. For example, the control signal may be provided to a motion prediction engine 130 which is described in more detail below.

Since the end user utilizes an input controller (e.g., a game controller), the end user typically has limited ability to finely control the in-game character. For example, the end user may select a button which is associated with passing a basketball to another teammate. In this example, and without the techniques described herein, such coarse control may result in an electronic game outputting a similar animation for the in-game character. In contrast, the generative control engine 120 may output a substantially unique, and varied, control signal given the same user input 114 from an end user. The control signal may therefore be used to output a large variation of subtle motion behaviors based on user input 114.

To enable such large variations, the generative control engine 120 may represent an autoencoder which encodes the combined user input 114 and character control variables into a learned latent feature space. As will be described, the latent feature space may be trained based on motion capture information and represent a lower-dimensional space which better matches the coarse high-level user input 114 received from the end-user. During runtime, the generative control engine 120 may then sample the latent feature space about the encoding, for example via the addition of noise (e.g., sampled from Gaussian distribution). The sample may then be decoded via the autoencoder and provided as the control signal.

In this way, the generative control engine 120 may ensure that variations of control signals are automatically generated from a same user input 114. Since these control signals are used by the dynamic animation generation system 100 to generate motion for the in-game character, the variations may result in a large breadth of animations. With respect to the illustrated example, the generative control model 120 may therefore reduce an extent to which similar character poses are shown to the end user.

The animation control information 112A may further include additional information 118. For example, character state information associated with an in-game character may be included. The character state may indicate, for example, the character pose for the in-game character. For example, the character state may represent positions, rotations, and velocities of bones used in an underlying skeleton or rig of the in-game character.

The additional information 118 may further include conditioning features. For example, conditioning features may be used to describe contacts by the in-game character with an in-game environment. In this example, the contacts may indicate contacts with hands, feet, a head, an external object (e.g., a basketball), and so on, by the in-game character with an in-game environment. An illustrated of example contacts is included in FIG. 5A.

With respect to a sports electronic game, the conditioning features may additionally include ball movement information. For example, the position and velocity of an in-game basketball may be utilized by the system 100 to dynamically generate animation. In this example, the basketball may be used to inform movement of the in-game character's hands, movement of the ball itself, and so on.

The additional information 118 may further include opponent information. For example, the opponent information may reflect a state of an in-game opponent with respect to the in-game character. Example information may include labels indicating whether the opponent (or portions thereof) are within a threshold radius of the in-game character. Example information may further include vectors indicating position samples between the opponent and in-game character along with direction and velocity of the opponent trajectory. An illustration of opponent information is included in FIG. 5B. As will be described, the dynamic animation generation system 100 may be trained in some embodiments using motion capture information which includes motion of an actor and at least one other actor representing an opponent. During training, the dynamic animation generation system 100 may therefore learn features indicative of the actor's motions to handle proximity of the other actor.

To generate the animation control information 112B for frame 'i+1', the dynamic animation generation system 100 includes a motion prediction engine 130. The motion prediction engine 130 may represent a neural network with a particular number of layers (e.g., 3, 5, 7, 12, and so on). Without being constrained by theory, it may be appreciated that the neural network may be trained to output animation control information for a subsequent frame (e.g., frame i+1) 112B.

The motion prediction engine 130 may use the additional information 118 for frame 'i' along with a control signal generated by the generative control engine 120 as input. A forward pass through the neural network may be computed and the animation control information 112B for frame 'i+1' may be output by the dynamic animation generation system 100.

Therefore, the motion prediction engine 130 may output a character pose for frame 'i+1'. Similar to the above, the animation control information 112B may then be provided as input to the dynamic animation generation system 100, which may continue autoregressively generating motion for the in-game character. The generated motion may be animated by the in-game character through adjustment of, at least, the character pose.

Generative Control Model

The dynamic animation generation system 100 may utilize a generative control model to improve upon interpretation of coarse user input provided by an input device (e.g., a controller). As described above, with respect to at least FIG. 1B, the system 100 includes a generative control engine 120 usable to output a control signal for use by a motion prediction engine 130. The generative control engine 120 may generate the control signal based on perturbing the user input. This way, the same user input may cause the motion prediction engine 130 to output different (e.g., slightly different), and realistic, character poses.

As will be described below, with respect to FIGS. 2A-2D, the generative control engine 120 may represent an autoencoder which is trained based on motion capture information. For example, the motion capture information may be analyzed to identify character control variables. In this example, the character control variables may describe aspects of an actor's movement or trajectory (e.g., the actor's locomotion). The autoencoder may then learn a latent feature space which encodes lower-dimensional embeddings of these character control variables.

The generative control engine 120 may, in some embodiments, be trained prior to training of the motion prediction engine 130. For example, the motion prediction engine 130 may be trained using end-to-end training subsequent to training of the generative control engine 120.

Figure 2A:
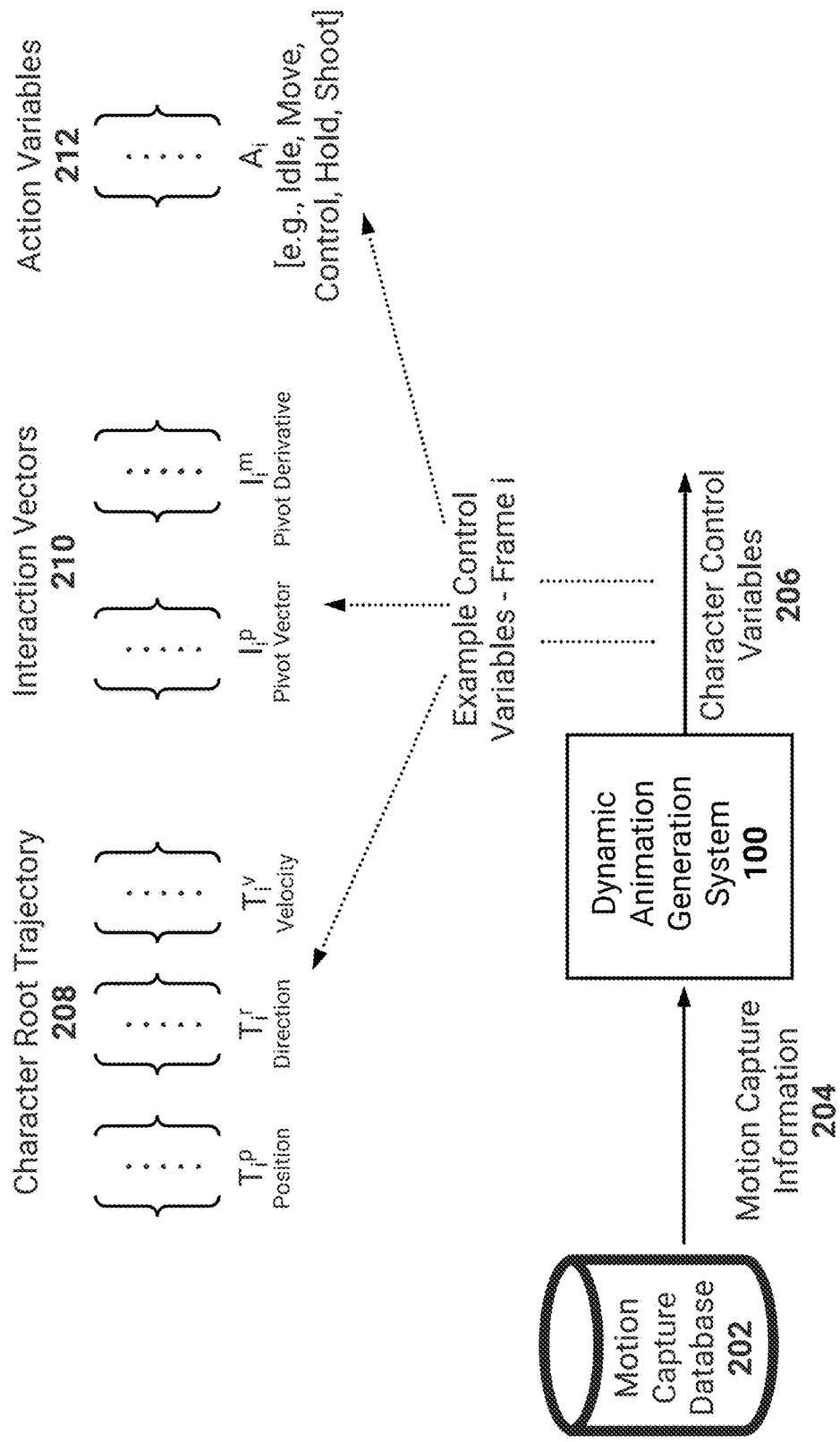
FIG. 2A is a block diagram of the dynamic animation generation system determining character control variables based on motion capture information.

FIG. 2A is a block diagram of the dynamic animation generation system 100 determining character control variables 206 based on motion capture information 204. The dynamic animation generation system 100 can access a motion capture database 202 and obtain motion capture information 204 for utilization. Example motion capture information 204 may include frames (e.g., image frames, time stamps of information) which may be used to identify aspects of a motion capture actor.

The system may characterize the actor's position, motion, and/or interaction with an external environment or opponent, type of action being performed, and so on. For example, a character pose may be determined for the actor (e.g., positions, orientations, and so on, of bones, end effectors, and so on of the actor). A bone, or end effector, as described herein, may represent a specific portion of the actor which is being monitored in images or video obtained using the motion capture studio. A bone may also represent an object which is external to the actor but for which motion is to be learned. Example bones described herein may include a left hand, a right hand, a left foot, a right foot, a ball (e.g., basketball), and so on. A bone may also be referred to herein as a rigid body.

It may be appreciated that these bones may be adjusted and fall within the scope of the disclosure herein. For example, additional bones may relate to specific fingers of the actor. Additional bones may further relate to rotational information associated with an actor. As an example, a bone may represent a rotation of a knee representing an extension of an actor's leg. This may be useful for electronic games for which motion requires complex rotations. Example electronic games may include wrestling games, racing games, and so on. With respect to racing games, a bone may represent a rotation of an actor's foot about an ankle. Similarly, additional bones may relate to additional objects which are utilized by an actor. With respect to sports games, a hockey stick, bat, and so on may represent one or more bones. Furthermore, quadrupeds may be used in a motion capture studio. For quadrupeds, such as dogs, the four legs of the dog may represent the bones optionally along with the tail and/or snout.

Motion capture information may be stored according to different motion capture formats, such as BVH and so on. Optionally, the motion capture information may represent image or video data taken at a particular frame rate. Thus, there may be 24, 30, 60, frames per second, which depict an actor moving about a motion capture studio. Optionally, the actor may have markers usable to track portions of the actor's body. Optionally, computer vision techniques may be used to identify specific feature of the actor's body (e.g., hands, arms, and so on). In some embodiments, an external object (e.g., a basketball) may have a marker on, or a sensor within, the object. Optionally, computer vision techniques may be used to analyze positions of the external object in the image or video data.

While the description above described use of an actor, in some embodiments video may be obtained of real-world events. For example, video from a real-world sports game may be obtained and analyzed. In this example, a particular player may be analyzed identify specific portions of the player's body. Example portions may include the player's hands, feet, head, and so on.

Based on these characterizations, the system 100 may generate character control variables 206 for each frame of the motion capture information 204. With respect to a frame, the character control variables 206 may be determined for the frame using a window of N frames centered on the frame. Thus, frames prior, and subsequent, to the frame may be analyzed.

For example, FIG. 2A illustrates example character control variables 206 which may be determined by the system 100. While FIG. 2A illustrates example variables which may be determined, in some embodiments a portion of these may be determined or different character control variables may be determined.

The character control variables 206 may be determined for each frame of motion capture information 204. The variables 206 may be determined for a window centered on the frame, which includes a threshold number of frames prior to, and subsequent to, the frame. For example, one second prior to, and one second subsequent to, the frame may be used. In this example, there may be 10, 13, 16, samples used.

Character root trajectory 208 may be determined by the dynamic animation generation system 100. These trajectory variables may include position information of the actor for the frame (e.g., horizontal path), directional information, and velocity information.

Interaction vectors 210 may be determined by the system 100 which describe interactions of the actor. For example, and with respect to a basketball game, the interaction vectors 210 may be used to direct ball control, such as ball dribbling (e.g., location, speed, height), controlling switching and turning maneuvers, and also the position of the ball. To determine the interaction vectors, the system may determine three-dimensional pivot vectors associated with the actor.

For example, the three-dimensional pivot vectors may represent horizontally-normalized vectors around a root of the actor. An example root may represent a hip bone of the actor.

Action variables 212 may indicate labels associated with types of actions. For each type of action, the action variables 212 may assign a weight associated with the action. As an example, the weight may vary between zero and one. These labels may be determined by the system 100 based on analyzing the motion capture information 204. Example labels may include Stand or Move and may therefore indicate whether the actor is standing or moving for a window of frames centered on a particular frame. To determine weights for these labels, the system may use a velocity associated with the actor. For example, a root velocity magnitude may be determined. Thus, if the speed is the actor is low the system 100 may increase a weight associated with standing.

With respect to a basketball game, additional labels may include Dribbling, Holding, Shooting, Passing, and so on. These labels may similarly be determined by the dynamic animation generation system 100. For example, with respect to dribbling the system 100 may detect contact of the actor with respect to a basketball in the motion capture information 204. If this contact follows a certain pattern, or the contact is repeated, the system 100 may increase a weight associated with dribbling. For Holding, the system 100 may determine whether the actor's hands are in contact with the basketball for greater than a threshold amount of time. For Shooting, the system 100 may determine whether the basketball leaves the actor's hands. Optionally, the Shooting label may be increased if the basketball reaches greater than a threshold height. For Passing, the system 100 may determine whether the basketball leaves the actor's hands and is obtained by another actor. The system 100 may also determine whether the basketball leaves the actor's hands but remains less than the threshold height.

While the action variables 212 described above relate to basketball, it may be appreciated that other action labels which relate to other sports may be used. For example, and with respect to hockey, a Passing label, Checking label, Slapshot label, and so on, may be used.

In this way, the dynamic animation generation system 100 may learn different character control variables 206 usable to describe motion of a motion capture actor. For example, the character root trajectory 208 variables may describe specifics of the actor's motion itself. The interaction vectors 210 may be used to describe motion associated with the character's interaction with an external object or environment (e.g., a basketball). The action variables 212 may be used to describe specific types of motion which the actor is performing.

Advantageously, these character control variables 206 may be determined without, or with limited, user input. Thus, the dynamic animation generation system 100 may access motion capture information 204 and automatically generate the character control variables 206 for use in the machine learning techniques described herein.

Figure 2B:
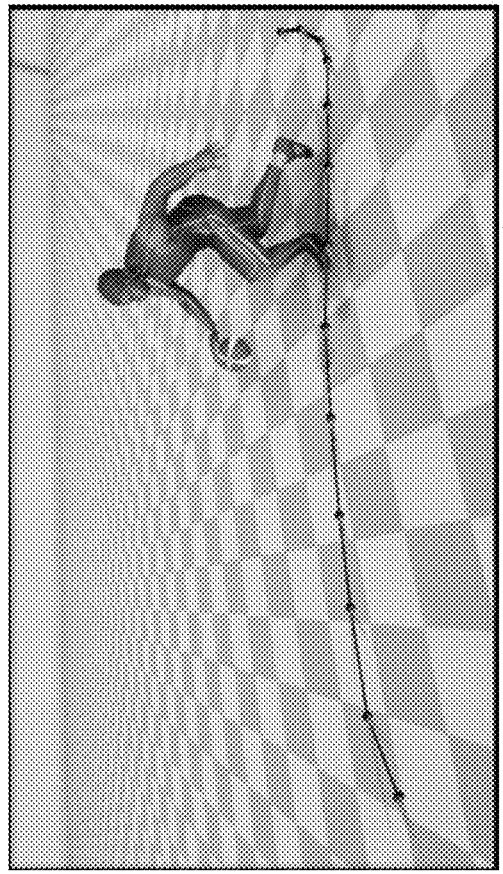
FIG. 2B illustrates example information included in the determined character control variables.
Figure 2B:
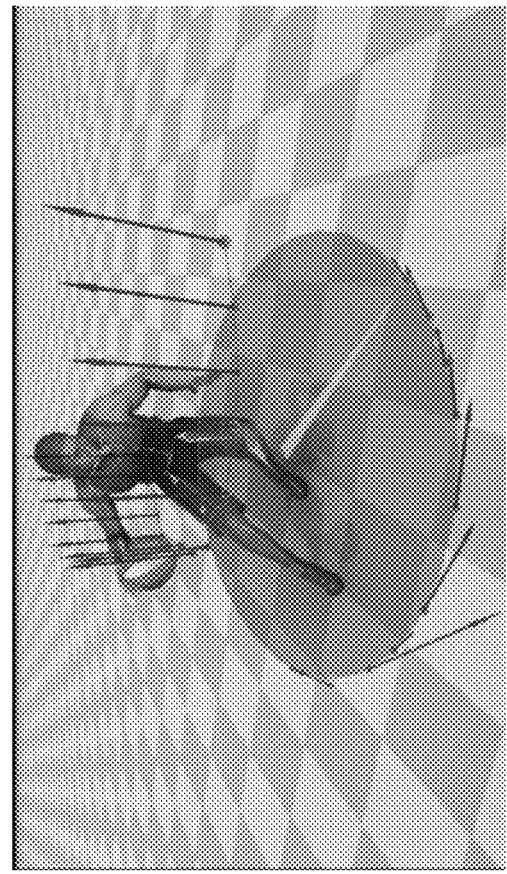
Figure 2B:
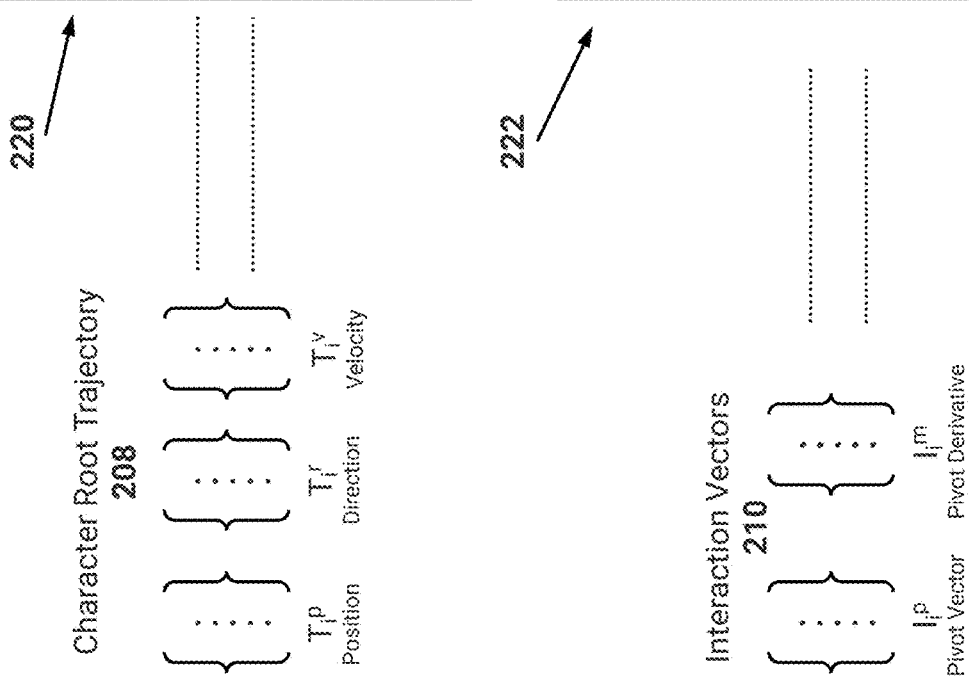

FIG. 2B illustrates example information included in the determined character control variables. In the illustrated example, character root trajectory 208 variables are represented in a first rendering 220 associated with an electronic game. While FIG. 2B illustrates an in-game character, it may be appreciated that the in-game character may be illustrated as following previously recorded motion capture movements of an actor. The first rendering 220 indicates, for example, positions of the character over a window of frames centered on a particular frame included in the first rendering 220. As an example, the positions indicate positions behind and in front of the character. These positions may therefore represent a threshold number of positions sampled for the window. In the illustrated embodiment, 13 positions are identified.

Additionally, interaction vectors 210 are represented in a second rendering 222 associated with the electronic game. The example interaction vectors 210 indicate vectors which track interaction with an object (e.g., a basketball). In this way, the dynamic animation generation system 100 may learn how motion capture actors interact with the object.

Figure 2C:
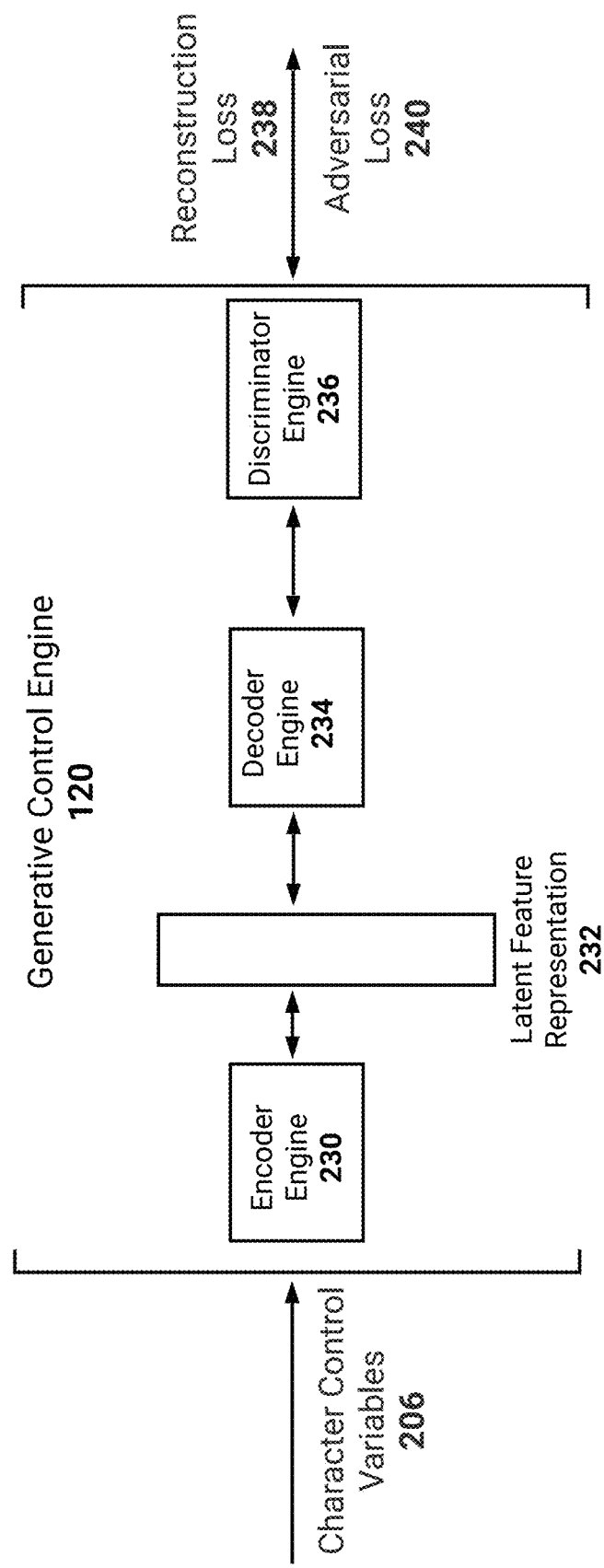
FIG. 2C is a block diagram illustrating training of a generative control engine usable to output a control signal for guiding a character's movement.

FIG. 2C is a block diagram illustrating training of a generative control engine 120 usable to output a control signal for guiding a character's movement. As described above, with respect to at least FIG. 1B, the dynamic animation generation system 100 may include the generative control engine 120. The generative control engine 120 may represent an autoencoder with an encoder engine 230 and a decoder engine 234. In the illustrated example, a discriminator engine 236 is utilized to provide adversarial training for the autoencoder. As may be appreciated, the discriminator engine 236 may be used, in some embodiments, during training and not during runtime (e.g., gameplay of an electronic game).

The generative control engine 120 may obtain character control variables 206 generated based on a frame of the motion capture information described above. For example, the character control variables 206 may represent information determined from a window of N frames centered about the frame. The encoder engine 230 may encode the character control variables 206 into a latent feature representation 232. For example, the latent feature representation 232 may represent a vector associated with a threshed number of latent variables defining a latent feature space. The decoder engine 234 may then decode the latent feature representation. In this way, the autoencoder may learn to reconstruct the character control variables 206.

The character control variables 206 may represent a ground truth, such that a reconstruction loss 238 may be determined. In some embodiments, the reconstruction loss 238 may be determined using mean squared error between the output of the decoder engine 234 and the input character control variables 206. In some embodiments, an L1 loss may be used for the reconstruction loss 238. In addition to the reconstruction loss 238, an adversarial loss 240 may optionally be determined. For example, the discriminator engine 236 may output a score associated with real and fake inputs.

The generative control engine 120 may combine the reconstruction loss 238 and adversarial loss 240. For example, the losses may be weighted. In this example, the reconstruction loss 238 may be weighted by a greater a degree than the adversarial loss 240. Using the combined losses, the generative control engine 120 may update the autoencoder and discriminator. For example, weights of the encoder engine 230 (e.g., weights of the layers associated with the encoder portion of a model), decoder engine 234 (e.g., weights of the layers associated with the decoder portion of the model), and discriminator engine 236, may be updated.

In this way, the generative control engine 120 may be trained to learn the above-described latent feature space. As may be appreciated, end-users playing an electronic game may have limited capability to provide user input. For example, typically an end-user may operate a controller with a threshold number of control sticks, buttons, and so on. Since this input is high-level, the learned feature space may represent a smoothed manifold which can better match with the less-detailed control signals given during runtime.

Figure 2D:
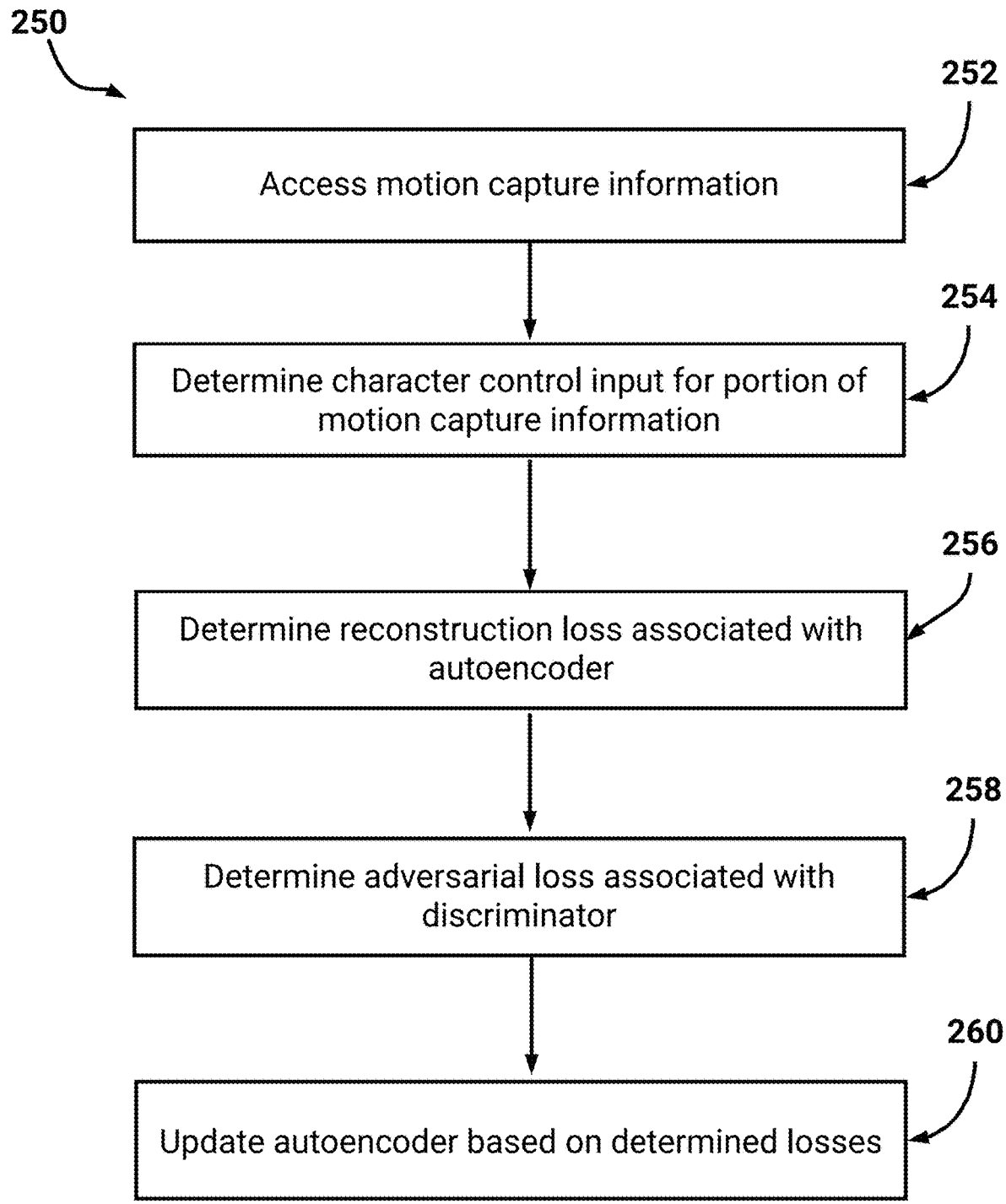
FIG. 2D is a flowchart of an example process for training a generative control model.

FIG. 2D is a flowchart of an example process 250 for training a generative control model. For convenience the process 250 will be described as being performed by a system of one or more computers (e.g., the dynamic animation generation system 100).

At block 252, the system accesses motion capture information. As described above, the motion capture information may reflect information describing movement of an actor. The motion capture information may also reflect information describing movement of one or more external objects (e.g., a basketball).

At block 254, the system determines character control variables for a portion of the motion capture information. As described in FIG. 2B, the system determines different types of information based on analyzing the motion capture information. The information may be determined for the portion, which may represent a frame centered in a window of N frames. For example, the portion may include motion capture information for a threshold amount of time (e.g., 1 second, 2 seconds). In this example, the determined character control variables may be associated with a substantially center of the portion (e.g., a particular frame or time stamp).

At block 256, the system determines a reconstruction loss associated with an autoencoder. The generative control model may represent an autoencoder which encodes character control variables into a latent feature space with a threshold number of latent variables. To train the autoencoder, the system determines a latent feature encoding associated with the determined character control variables. A decoder may then generate an output based on the latent feature encoding, and the reconstruction loss may be determined using the output. For example, the reconstruction loss may represent an L1 or L2 loss determined based on the output and the character control variables.

At block 258, an adversarial loss may be determined. In some embodiments, a discriminator may be used to distinguish output from the encoder from the ground truth (e.g., the determined character control variables). The adversarial loss may be determined based on real and fake inputs.

At block 260, the system updates the autoencoder based on the determined losses. In some embodiments, for each iteration of training, after each loss is calculated, a total loss is calculated as a weighted sum of all different loss. Subsequently, the loss is differentiated and back-propagated to discriminator, decoder and encoder, since those networks may be in a serialized order.

Training—Dynamic Animation Generation System

As described above, with respect to FIG. 1B, the dynamic animation generation system 100 may be used to autoregressively generate motion for an in-game character to follow. The dynamic animation generation system 100 may include different elements usable to generate the motion. For example, FIG. 1B includes a generative control engine 120 and a motion prediction engine 130. The output of the motion prediction engine 130 may be used to determine, at least, a character pose for a subsequent (e.g., next) frame. Thus, the in-game character may be rendered according to the character pose in the subsequent frame.

Described below are example techniques to train the dynamic animation generation system 100. The generative control engine 120, as described in FIGS. 2A-2D, may be pre-trained based on motion capture information. Subsequently, the motion prediction engine 130 may be trained in an end-to-end manner based on the motion capture information.

Figure 3:
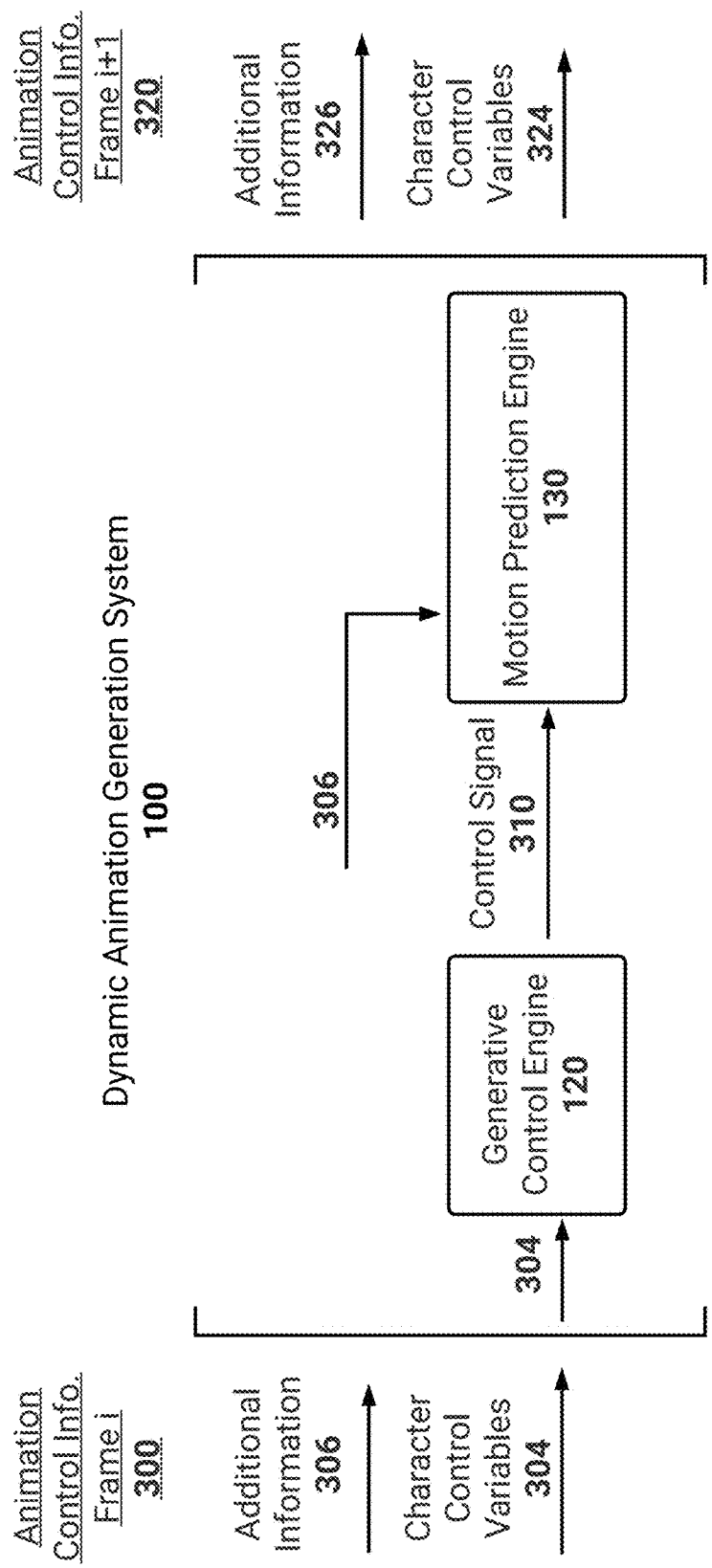
FIG. 3 is a block diagram illustrating training of a motion generation network.

FIG. 3 is a block diagram illustrating training of a motion generation model implemented by a motion prediction engine 130. To perform training, animation control information 300 may be used as an input to the system 100. This information 300 may be generated using motion capture information as described herein. For example, frame 'i' of motion capture information may be accessed. In this way, character control variables 304 for the frame may be determined as described above in FIGS. 2A-2D. Since the generative control engine 120 may be pre-trained, the engine 120 may generate a control signal 310 based on the character control variables 304.

Additional information 306 may be determined based on the motion capture information for frame 'i'. The additional information 306 may, in some embodiments, be determined using a window of N frames centered on the frame. Example additional information 306 is described above in FIG. 1B, with respect to the additional information 118. This information 306 may include character state information, indicating positions, rotations, and velocities for bones of the motion capture actor. In some embodiments, there may be a particular number of bones being monitored by the system 100 (e.g., 24, 26, and so on). The information may further include conditioning features, such as movement information for an external object (e.g., a basketball), contact information for specific bones (e.g., hands, feet, the external object), and so on as described above.

Advantageously, the additional information 306 may additionally describe opponent information. Example opponent information may include variables which describe respective states of one or more opponents. For example, a motion capture actor may be used to represent an in-game character (e.g., a basketball player being controlled by an end user) while one or more other motion capture actors may be used to represent opponent characters. In some embodiments, the opponent information may include labels informing whether the opponents are within a threshold radius of the motion capture actor. The opponent information may further include vectors between sample positions of the motion capture actor's trajectory and respective opponent motion capture actor trajectories as well as direction and velocity of the opponent trajectories. Opponent information may further include distance pairs between respective bones of the motion capture actor and bones of an opponent motion capture actor. A graphical representation of these distance pairs is illustrated in FIG. 5B.

Using the above-described input to the system 100, the system 100 may compute a forward pass. For example, as input to the motion prediction engine 130 the control signal 310 and additional information 306 may be provided. Based on this input, the motion prediction engine 130 may generate output which forms the animation control information 320 for frame 'i+1'. The generated output may include updated control variables 324, and updated additional information 326. The output may reflect, for example, a character pose for frame 'i+1'). Based on this generated output, as compared to a ground truth from motion capture, the motion prediction engine 130 may be updated. For example, the neural network implemented by the motion prediction engine 130, may be updated.

Example Flowchart

Figure 4A:
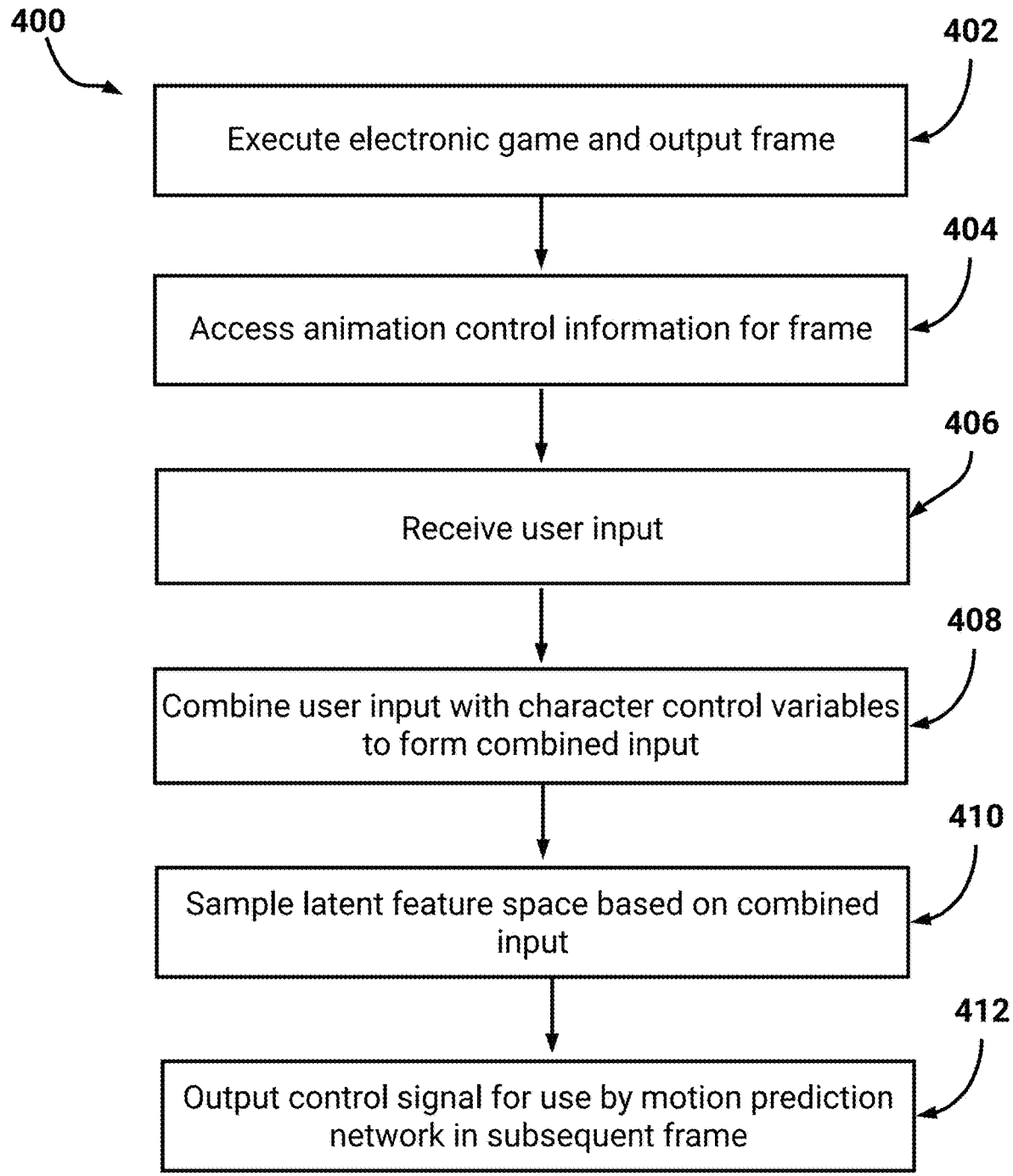
FIG. 4A illustrates an example process for generating a control signal by a generative control model

FIG. 4A illustrates an example process 400 for generating a control signal by a generative control model. For convenience, the process 400 will be described as being perfumed by a system of one or more computers (e.g., the dynamic animation generation system 100). In some embodiments, the system may represent an electronic game console of one or more processors which is configured to execute electronic games.

At block 402, the system executes an electronic game and outputs a frame. As described herein, the system may implement a motion generation model usable to update one or more in-game characters of an electronic game. For example, the motion generation model may cause character poses of the in-game characters to be updated such that animation may be generated.

In some embodiments the system may represent an application, or software, which is in communication with an electronic game. For example, an electronic game console may execute the electronic game and the application or software. In this example, the electronic game console may provide information from the executing game for use by the application or software. Example information may include a game state associated with the electronic game, which may be used by the application or software to generate or derive the animation control information described above. The application or software may therefore update character poses of one or more in-game characters and provide the updated character poses to the electronic game. In response the electronic game may update the in-game characters accordingly.

In some embodiments, the system may represent a portion of an electronic game. For example, the motion generation model may be imported into the electronic game (e.g., as a module). The motion generation model may then access the game state and cause updating of in-game characters.

At block 404, the system accesses animation control information for the frame. As described above, with respect to at least FIGS. 1A-1B, the system may autoregressively generate animation control information. Thus, the system may access animation control information which was generated for the output frame. The information may then be used to generate subsequent animation control information for a subsequent frame.

This animation control information may include, at least, character control variables which describe trajectory information of an in-game character and may include action variables indicating actions being performed. The character control variables may further describe interactions by the in-game character with one or more external objects, an external environment, and so on as described in FIGS. 2A-2D.

At block 406, the system receives user input from an end user of the electronic game. The user input may be provided via an input controller communicatively coupled to the electronic game. For example, the input controller may be connected to an electronic game console via a wired or wireless connection. As another example, the input controller may provide information via a network (e.g., the internet) to a system executing the electronic game (e.g., cloud-based streaming of the electronic game).

At block 408, the system combines the user input with the character control variables to form combined input. The user input may be combined with the character control variables according, as an example, to a weighting. An example weighting may be based on time. For example, the character control variables may include information associated with a window of time. In this example, the variables may store information for a prior threshold number of frames along with a current frame. Thus, the information for earlier of the frames may be weighted less than the information for later of the frames.

The user input may additionally be mapped to a similar form as the character control variables (e.g., particular user input may be associated with particular actions). For example, certain control sticks of the input controller may be used to update specific character control variables. In this example, a first control stick may be used to update a trajectory of the electronic character. Thus, if the first control stick is moved forward, backward, to the left or right, the trajectory may be updated accordingly. In this way, trajectory information indicated in the character control variables may be updated.

A second control stick may be used to control other aspects of gameplay. For example, a basketball game may use the second control stick to indicate passing directions. In this example, movement of the second control stick may indicate that the in-game character is to pass a basketball in a certain direction. Therefore, the system may update interaction vectors (e.g., interaction vectors 210 described in FIGS. 2A-2B). As described above, the interaction vectors may be used to inform integration with the basketball. The second control stick may also be used to control dribbling locations about the in-game character. This may allow for motion such as switching of the basketball between the in-game character's hands. For dribbling locations, the system may update interaction vectors to update a dribbling height, frequency, and/or direction, associated with the basketball.

The buttons on the input controller may additionally be mapped to character control variables (e.g., a button may be mapped to particular movement to be performed). For examples, a button may cause the in-game character to spin. Upon selection of this button, the trajectory direction may not be updated but rather trajectory information indicating rotational movement may be updated. As another example, a holding button may cause the in-game character to hold the ball. Upon selection of the holding button, the interaction vectors may be updated to reflect that the basketball is to cease being dribbled. Similarly, an action variable may be updated to reflect the holding.

The above-described are some of the examples which the system may use to map user input to character control variables. Additional techniques may be used and fall within the scope of the disclosure herein.

At block 410, the system samples the latent feature space based on the combined input. The generative control model may represent an autoencoder, which encodes input information into a learned latent feature space. Thus, the system may generate a latent feature representation of the combined input via use of the autoencoder. To ensure that a wide variety of output control signals are generated, the system adjusts the latent feature representation.

For example, the system may combine the latent feature representation with additive noise. The noise may be sampled from a Gaussian distribution and may be used to adjust the latent feature representation. In this way, slight variations of the latent feature representation may be generated. Since the latent feature space is used to encode low-dimensional character control information, the resulting output from the decoder should be a control signal which provides for realistic character control.

In some embodiments, the additive noise may vary based on an in-game character being used. For example, certain in-game characters may be assigned, or otherwise associated with, greater measures of noise (e.g., amplitude of noise). In this example, these in-game characters may therefore produce wider variations of character poses as compared to the received user input due to this enhanced noise. These wider variations may introduce a style element with respect to certain of the in-game characters.

At block 412, the system outputs a control signal for use by a motion prediction network. The control signal may therefore allow for a mapping of the high-level user input into a form which better represents the more complex character control information determined from motion capture information used during training of the generative control model. In this way, the system may compute a forward pass through the motion prediction network may and generate a character pose for a subsequent frame.

The system may then update character control variables for the subsequent frame. The character control variables in the output of the motion prediction network may be combined with received user input. For example, the user input may represent the end user interacting with an electronic game controller. As may be appreciated, these interactions may occur slower than an output frame rate of the electronic game. Thus, the user input may be combined with the character control variables for any frame in which the end user is interacting with the controller. The user input may also be aggregated over a threshold number of prior frames and used to update the character control variables every threshold number of frames (e.g., every 5 frames).

Since the user input is provided in the form of coarse, high-level controls, the system may convert the user input into a similar form as the character control variables. For example, an as described above, if the end user is holding down a control stick to move forward, then the system may generate trajectory information indicating that the in-game character is to move forward. As another example, if the end user interacts with a button to cause shooting of a ball, then the system may generate trajectory information indicating this type of motion. Similarly, the character control variables may include action variables (e.g., action variables 212 in FIG. 2A). Using these variables, the system may update the action variables to indicate that the in-game character is to perform the action of shooting the ball.

An example technique to update the character control variables, as described above, may include applying use of weighting to the output character control variables and user input. An example weighting may be based on time. For example, the character control variables may include information associated with a window of time. In this example, the variables may store information for a prior threshold number of frames along with a current frame. Thus, the information for earlier of the frames may be weighted less than the information for later of the frames.

Figure 4B:
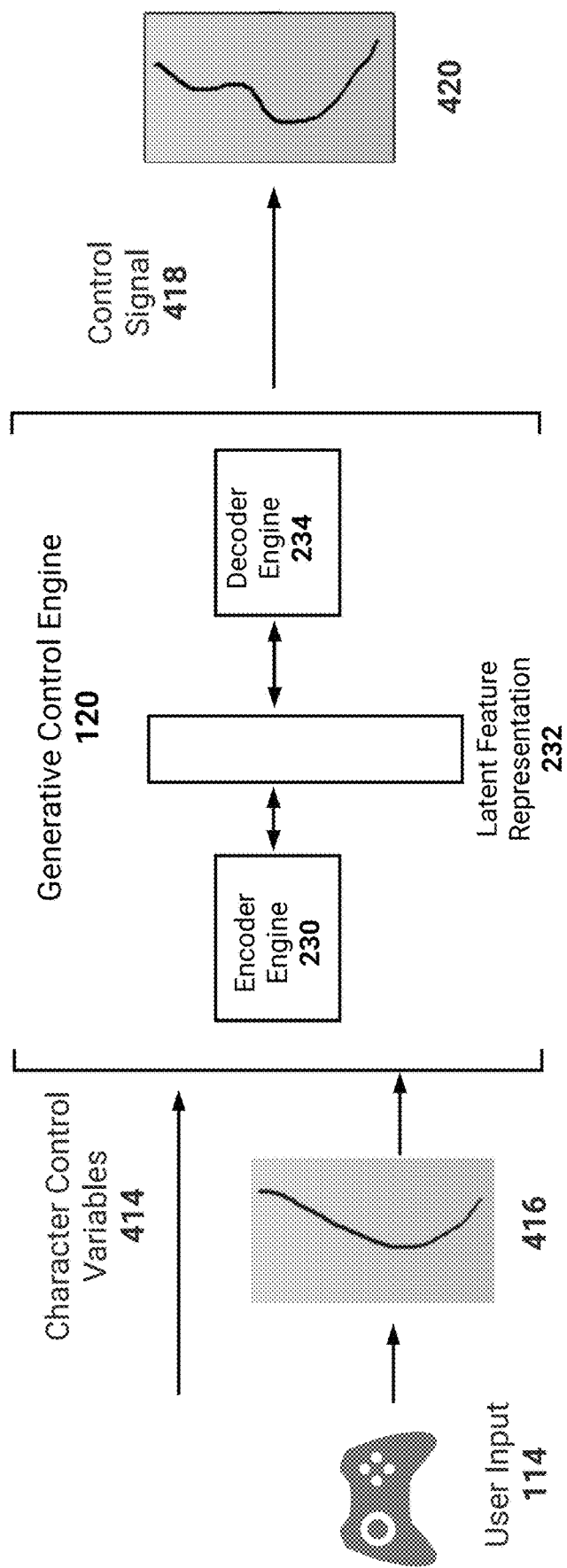
FIG. 4B is a block diagram of the generative control engine generating a control signal.

FIG. 4B is a block diagram of the generative control engine 120 generating a control signal 418. In the illustrated embodiment, the generative control engine 120 receives character control variables 414. The engine 120 additionally receives user input 114 which may represent high-level controls. For example, a first signal 416 associated with the user input 114 is illustrated in FIG. 4B. This first signal 416 illustrates a smooth input which is formed from interaction with a limited number of input controls.

The generative control engine 120 combines the character control variables 414 and user input 114 as described above. The engine 120 then generates a control signal 418 as described in FIG. 4A. This control signal 418 is represented as a second signal 420. As illustrated, the second signal 420 is more varied and irregular than the high-level first signal 416. This irregularity may increase an extent to which an end-user may receive varied, and unique, character poses for an in-game character. As describe herein, the control signal 418 may be used as input to a motion prediction engine 130 which may then output a character pose.

FIG. 4C illustrates example character pose variations 430. For example, a top portion of each column illustrates a series of character poses generated by the system. As another example, a corresponding bottom portion of the column illustrates an alternative series of character poses generated by the system using the generative control mode.

Example User Interfaces

FIGS. 5A-5D illustrate example user interfaces identifying aspects of the features described herein. These user interfaces may be rendered, at least in part, by an electronic game and represent an in-game character of the electronic game.

Figure 5A:
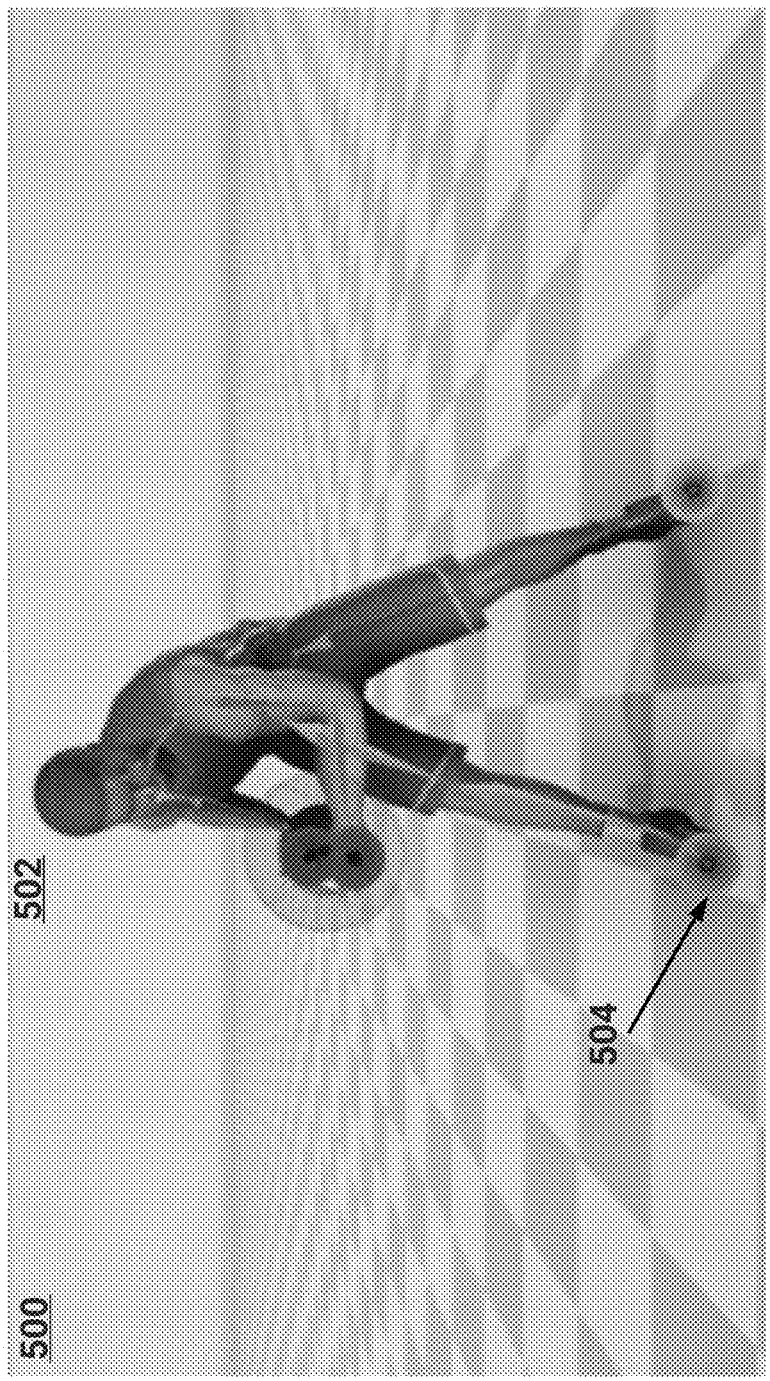
FIG. 5A is a user interface illustrating contacts by bones of an in-game character
Figure 5B:
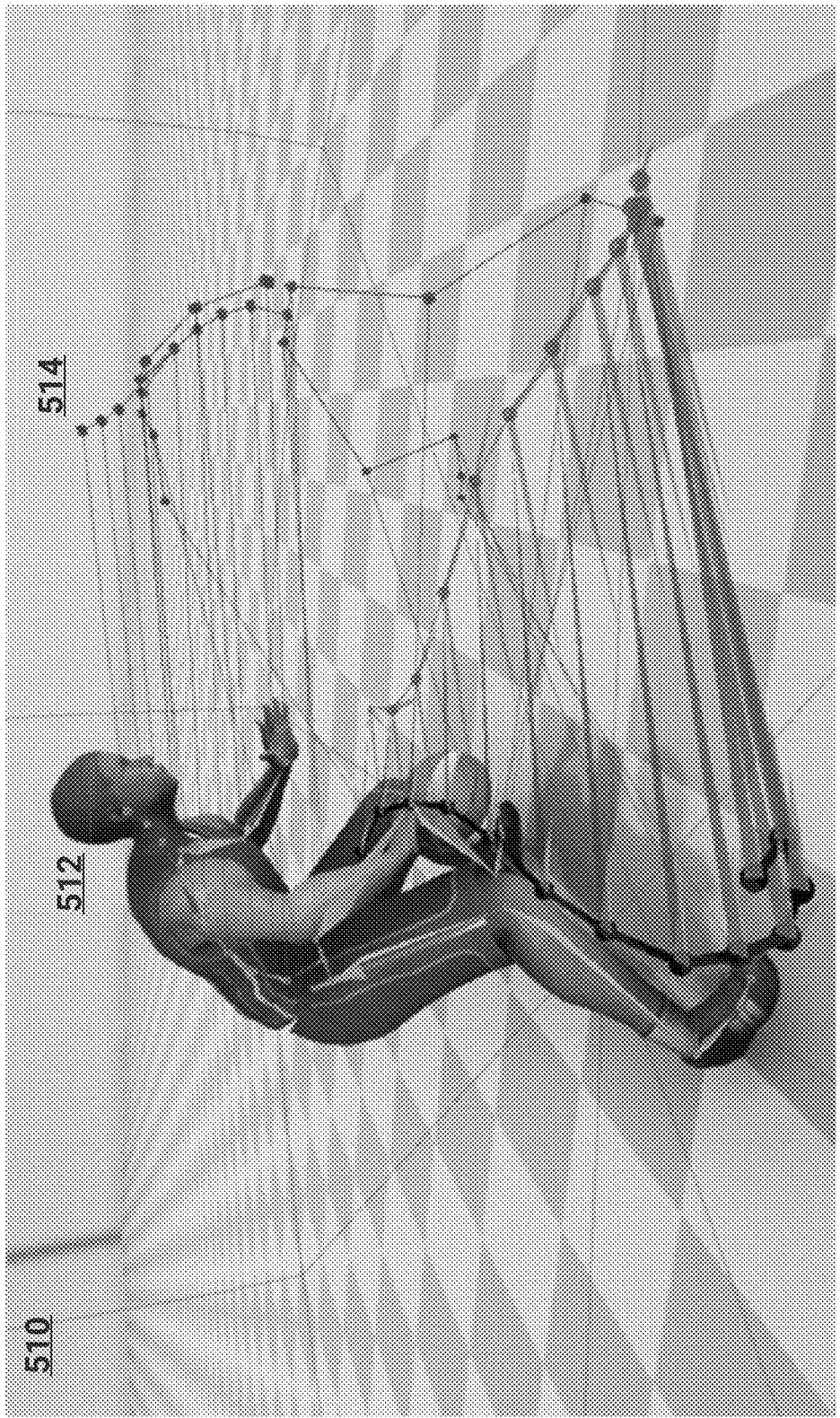
FIG. 5B is a user interface illustrating opponent information for an in-game character

FIG. 5A is a user interface 500 illustrating contacts by bones of an in-game character 502. For example, a contact 504 between the character's foot and in-game environment is illustrated. The contact 504 may be used, as an example in the additional information described above.

FIG. 5B is a user interface 510 illustrating opponent information for an in-game character 512. For example, the opponent information may include distance pairs 514 between bones of the in-game character 512 and an opponent character.

Figure 5C:
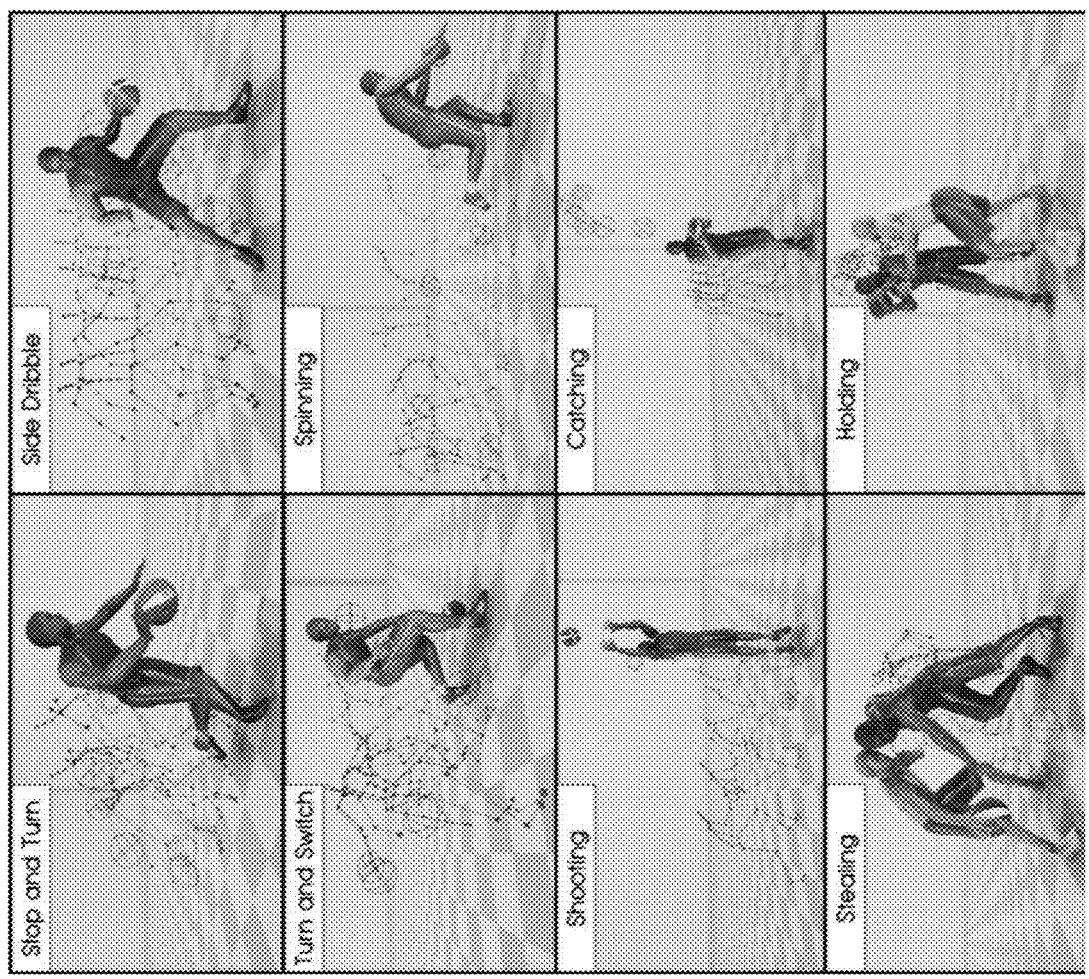
FIG. 5C is a user interface illustrating example motions generated by the dynamic animation generation system.

FIG. 5C is a user interface 520 illustrating example motions generated by the dynamic animation generation system. These motions include labels describing the complex asynchronous type of motion generated. These labels may optionally be used as action variables included in the character control variables (e.g., as described in FIGS. 2A-2D).

Figure 5D:
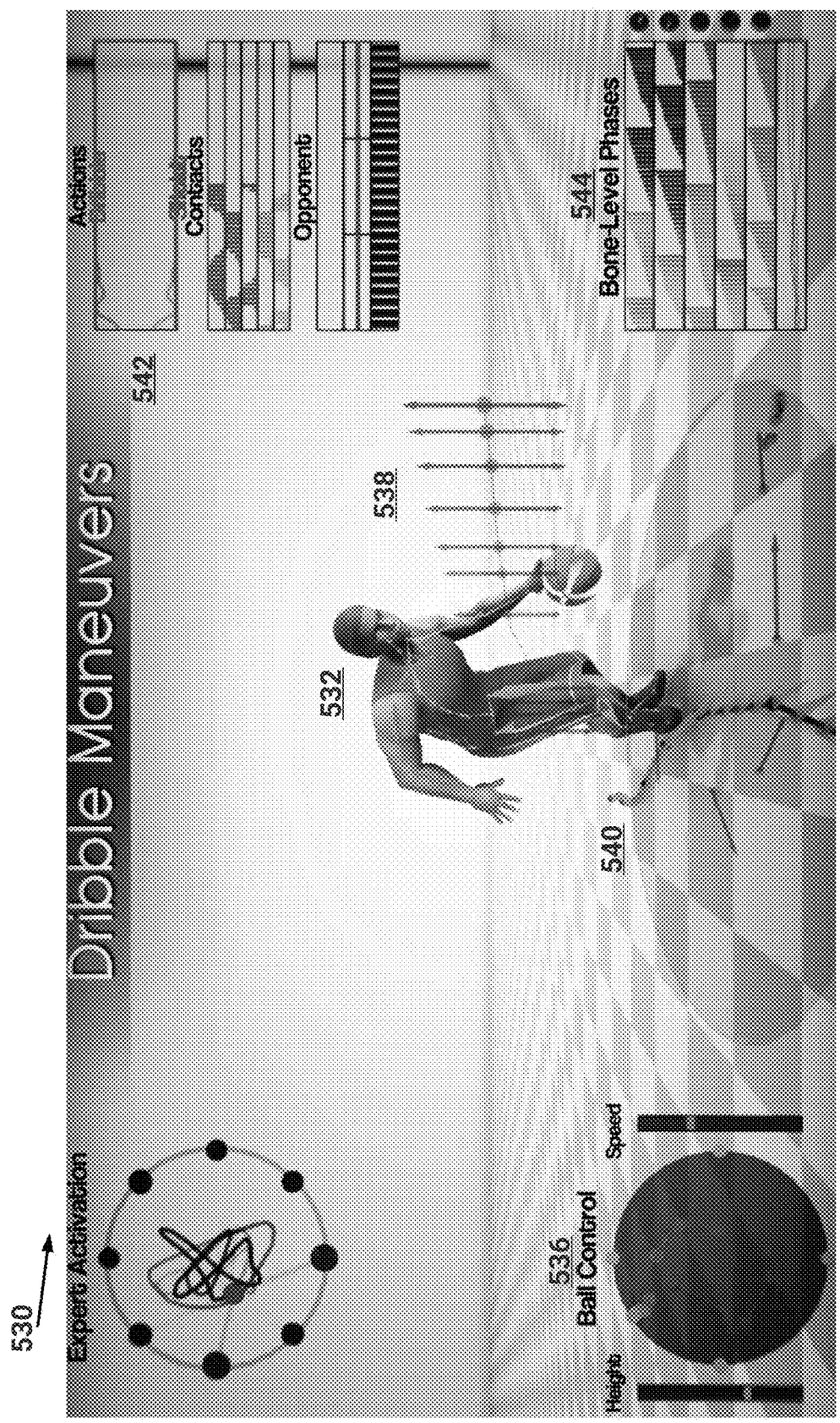
FIG. 5D is a user interface illustrating detailed information related to dynamic animation generation.

FIG. 5D is a user interface 530 illustrating detailed information related to dynamic animation generation. The user interface 532 may represent a user interface used by a developer or game designer to view the detailed information when controlling an electronic game character 532.

The user interface 530 further includes indications of character control variables 536-540. For example, user interface portion 536 identifies information indicative of movement of the basketball. Vectors 538 may indicate interaction vectors as described herein, and vectors 540 may indicate trajectory information of the in-game character 532.

User interface portion 542 further identifies actions which are being performed by the in-game character. Contacts by certain bones of the character 532 are further indicated in this portion 542 along with information associated with an opponent.

Example Computing System

Figure 6:
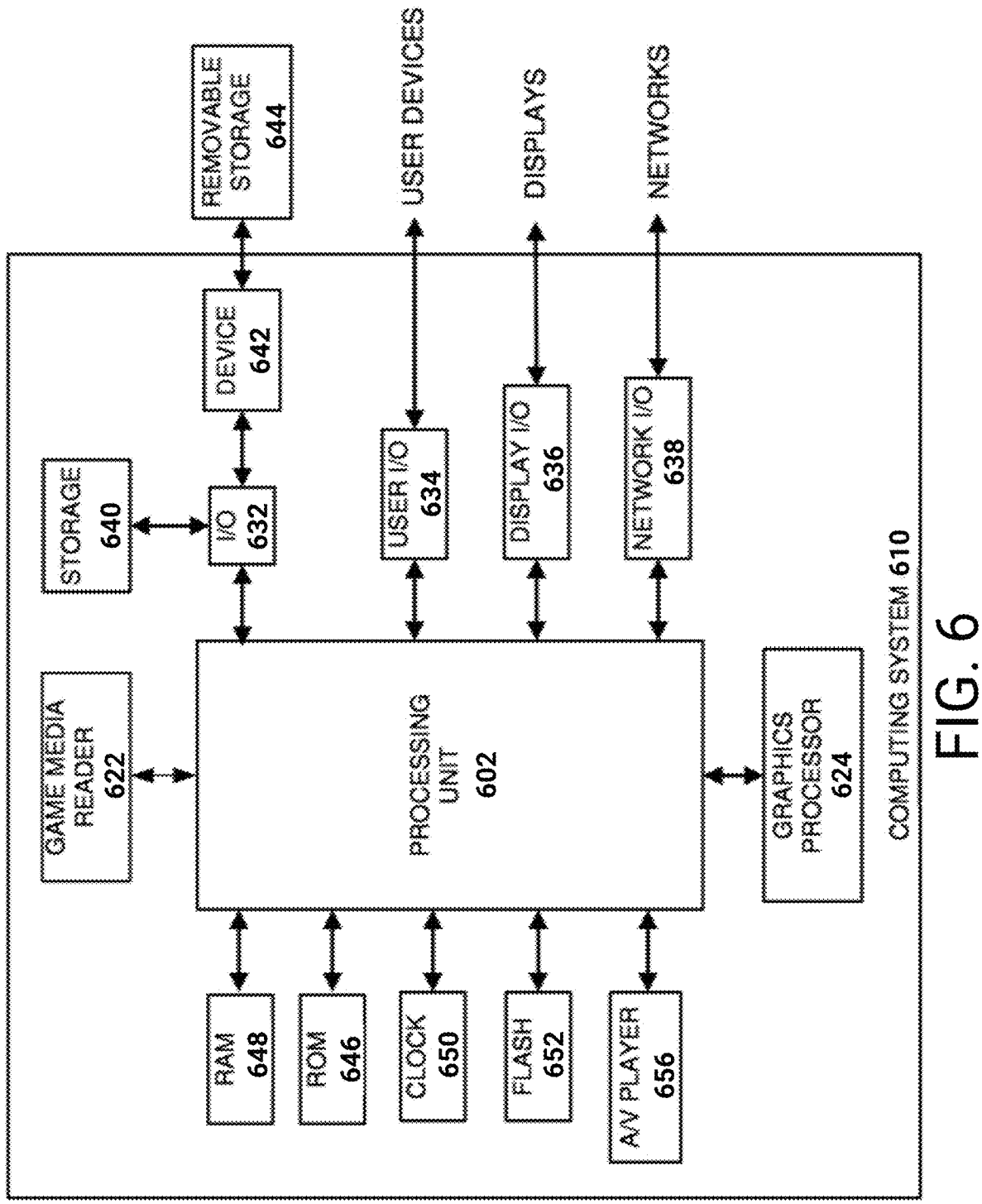
FIG. 6 illustrates an embodiment of computing device according to the present disclosure.

FIG. 6 illustrates an embodiment of computing device 610 according to the present disclosure. Other variations of the computing device 610 may be substituted for the examples explicitly presented herein, such as removing or adding components to the computing device 610. The computing device 610 may include a game device, a smart phone, a tablet, a personal computer, a laptop, a smart television, a car console display, a server, and the like. The computing device 610 may also be distributed across multiple geographical locations. For example, the computing device 610 may be a cluster of cloud-based servers.

As shown, the computing device 610 includes a processing unit 620 that interacts with other components of the computing device 610 and also external components to computing device 610. A game media reader 622 is included that communicates with game media 612. The game media reader 622 may be an optical disc reader capable of reading optical discs, such as CD-ROMs or DVDs, or any other type of reader that can receive and read data from game media 612. One or more of the computing devices may be used to implement one or more of the systems disclosed herein.

Computing device 610 may include a separate graphics processor 624. In some cases, the graphics processor 624 may be built into the processing unit 620. In some such cases, the graphics processor 624 may share Random Access Memory (RAM) with the processing unit 620. Alternatively or additionally, the computing device 610 may include a discrete graphics processor 624 that is separate from the processing unit 620. In some such cases, the graphics processor 624 may have separate RAM from the processing unit 620. Computing device 610 might be a handheld game application device, a dedicated game console computing system, a general-purpose laptop or desktop computer, a smart phone, a tablet, a car console, or other suitable system.

Computing device 610 also includes various components for enabling input/output, such as an I/O 632, a user I/O 634, a display I/O 636, and a network I/O 638. I/O 632 interacts with storage element 640 and, through a device 642, removable storage media 644 in order to provide storage for computing device 610. Processing unit 620 can communicate through I/O 632 to store data, such as game state data and any shared data files. In addition to storage 640 and removable storage media 644, computing device 610 is also shown including ROM (Read-Only Memory) 646 and RAM 648. RAM 648 may be used for data that is accessed frequently, such as when a video game is being played.

User I/O 634 is used to send and receive commands between processing unit 620 and user devices, such as game controllers. In some embodiments, the user I/O 634 can include a touchscreen input. The touchscreen can be capacitive touchscreen, a resistive touchscreen, or other type of touchscreen technology that is configured to receive user input through tactile inputs from the player. Display I/O 636 provides input/output functions that are used to display images from the game being played. Network I/O 638 is used for input/output functions for a network. Network I/O 638 may be used during execution of a game, such as when a game is being played online or being accessed online, application of fraud detection, and/or generation of a fraud detection model.

Display output signals produced by display I/O 636 comprise signals for displaying visual content produced by computing device 610 on a display device, such as graphics, user interfaces, video, and/or other visual content. Computing device 610 may comprise one or more integrated displays configured to receive display output signals produced by display I/O 636. According to some embodiments, display output signals produced by display I/O 636 may also be output to one or more display devices external to computing device 610.

The computing device 610 can also include other features that may be used with a video game, such as a clock 650, flash memory 562, and other components. An audio/video player 656 might also be used to play a video sequence, such as a movie. It should be understood that other components may be provided in computing device 610 and that a person skilled in the art will appreciate other variations of computing device 610.

Program code can be stored in ROM 646, RAM 648 or storage 640 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 640, and/or on removable media such as game media 612 (which can be a CD-ROM, cartridge, memory chip or the like, or obtained over a network or other electronic channel as needed). In general, program code can be found embodied in a tangible non-transitory signal-bearing medium.

Random access memory (RAM) 648 (and possibly other storage) is usable to store variables and other game and processor data as needed. RAM 648 is used and holds data that is generated during the execution of an application and portions thereof might also be reserved for frame buffers, application state information, and/or other data needed or usable for interpreting user input and generating display outputs. Generally, RAM 648 is volatile storage and data stored within RAM 648 may be lost when the computing device 610 is turned off or loses power.

As computing device 610 reads game media 612 and provides an application, information may be read from game media 612 and stored in a memory device, such as RAM 648. Additionally, data from storage 640, ROM 646, servers accessed via a network (not shown), or removable storage media 644 may be read and loaded into RAM 648. Although data is described as being found in RAM 648, it will be understood that data does not have to be stored in RAM 648 and may be stored in other memory accessible to processing unit 620 or distributed among several media, such as game media 612 and storage 640.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method, the method comprising:
accessing, via a system of one or one or more processors, an autoencoder trained based on character control information generated using motion capture data, the character control information indicating, at least, trajectory information associated with the motion capture data,
wherein the autoencoder is trained to reconstruct, via a latent feature space, the character control information, and output of the autoencoder is provided as a control signal to a motion prediction network;
obtaining, via the system during runtime of an electronic game, first character control information associated with a trajectory of an in-game character of the electronic game, wherein the first character control information is determined based on information derived during a window of frames generated by the electronic game, wherein user input is received from an input controller communicatively coupled to the electronic game;
generating, via the system, combined input from the first character control information and the user input, wherein the user input is mapped to character control information, and wherein the mapped user input perturbs the first character control information;
generating, via the system and based on the combined input via the autoencoder, a latent feature representation associated with the combined input and modifying the latent feature representation; and
outputting, via the autoencoder using the modified latent feature representation, a control signal to the motion prediction network for use in updating a character pose of the in-game character in a user interface associated with the electronic game.

2. The computer-implemented method of claim 1, wherein generating the latent feature representation comprises encoding the combined input.

3. The computer-implemented method of claim 1, wherein mapping the user input to character control information comprises:
identifying, based on the user input, an interaction with a particular button or control stick of the input controller;
mapping the interaction to second character control information; and
combining the first character control information and second character control information.

4. The computer-implemented method of claim 3, wherein the interaction is with respect to the control stick associated with movement of the in-game character, and wherein mapping the interaction to the second character control information comprises:
updating trajectory information of the second character control information to reflect a trajectory in a direction associated with the received input.

5. The computer-implemented method of claim 3, wherein the interaction is with respect to the particular button, and wherein mapping the interaction to the second character control information comprises:

identifying an action associated with the particular button, the action indicating movement to be performed by the in-game character; and updating the second character control information to reflect the corresponding indicated movement.

6. The computer-implemented method of claim 1, wherein modifying the latent feature representation comprises:

generating additive noise via sampling of a distribution; and modifying the latent feature representation based on the additive noise.

7. The computer-implemented method of claim 6, wherein generating additive noise is based on a noise amplitude, and wherein the noise amplitude is selected based on the in-game character, such that the in-game character and a different in-game character are assigned different measures of noise.

8. The computer-implemented method of claim 1, wherein the first character control information comprises trajectory information indicating a trajectory of the in-game character over the window of frames, interaction vectors indicating information usable to describe interactions with an external object, and action variables indicating action labels determined for the in-game character.

9. A system comprising one or more processors and non-transitory computer storage media storing instructions that when executed by the one or more processors, cause the one or more processors to perform operations comprising:

accessing an autoencoder trained based on character control information generated using motion capture data, the character control information indicating, at least, trajectory information associated with the motion capture data, wherein the autoencoder is trained to reconstruct, via a latent feature space, the character control information, and output of the autoencoder is provided as a control signal to a motion prediction network;

obtaining, during runtime of an electronic game, first character control information associated with a trajectory of an in-game character of the electronic game, wherein the first character control information is determined based on information derived during a window of frames generated by the electronic game, wherein user input is received from an input controller communicatively coupled to the electronic game;

generating combined input from the first character control information and the user input, wherein the user input is mapped to character control information, and wherein the mapped user input perturbs the first character control information;

generating, based on the combined input via the autoencoder, a latent feature representation associated with the combined input and modifying the latent feature representation; and outputting, via the autoencoder using the modified latent feature representation, the control signal for use, by the system, in updating a character pose of the in-game character in a user interface associated with the electronic game.

10. The system of claim 9, wherein generating the latent feature representation comprises encoding the combined input.

11. The system of claim 9, wherein mapping the user input to character control information comprises:

identifying, based on the user input, an interaction with a particular button or control stick of the input controller; and mapping the interaction to second character control information; and combining the first character control information ad second character control information.

12. The system of claim 11, wherein the interaction is with respect to the control stick associated with movement of the in-game character, and wherein mapping the interaction to the second character control information comprises:

updating trajectory information of the second character control information to reflect a trajectory in a direction associated with the received input.

13. The system of claim 11, wherein the interaction is with respect to the particular button, and wherein mapping the interaction to the second character control information comprises:

identifying an action associated with the particular button, the action indicating movement to be performed by the in-game character; and updating the second character control information to reflect the corresponding indicated movement.

14. The system of claim 9, wherein modifying the latent feature representation comprises:

generating additive noise via sampling of a distribution; and modifying the latent feature representation based on the additive noise.

15. Non-transitory computer storage media storing instructions that when executed by a system of one or more processors, cause the one or more processors to perform operations comprising:

accessing an autoencoder trained based on character control information generated using motion capture data, the character control information indicating, at least, trajectory information associated with the motion capture data, wherein the autoencoder is trained to reconstruct, via a latent feature space, the character control information, and output of the autoencoder is provided as a control signal to a motion prediction network;

obtaining, during runtime of an electronic game, first character control information associated with a trajectory of an in-game character of the electronic game, wherein the first character control information is determined based on information derived during a window of frames generated by the electronic game, wherein user input is received from an input controller communicatively coupled to the electronic game;

generating combined input from the first character control information and the user input, wherein the user input is mapped to the character control information, and wherein the mapped user input perturbs the first character control information;

generating, based on the combined input via the autoencoder, a latent feature representation associated with the combined input and modifying the latent feature representation; and outputting, via the autoencoder using the modified latent feature representation, the control signal for use, by the system, in updating a character pose of the in-game character in a user interface associated with the electronic game.

16. The computer storage media of claim 15, wherein mapping the user input to character control information comprises:

identifying, based on the user input, an interaction with a particular button or control stick of the input controller; and mapping the interaction to second character control information; and combining the first character control information ad second character control information.

17. The computer storage media of claim 15, wherein modifying the latent feature representation comprises:

generating additive noise via sampling of a distribution; and modifying the latent feature representation based on the additive noise.

\* \* \* \* \*